(12) United States Patent
Kim et al.

(10) Patent No.: US 11,327,686 B2
(45) Date of Patent: May 10, 2022

(54) APPARATUS AND METHOD FOR MANAGING INTEGRATED STORAGE SUPPORTING HIERARCHICAL STRUCTURE

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong-si (KR); Seong-Woon Kim, Gyeryong-si (KR); Soo-Cheol Oh, Daejeon (KR); Jae-Geun Cha, Daejeon (KR); Ji-Hyeok Choi, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/019,925

(22) Filed: Sep. 14, 2020

(65) Prior Publication Data

US 2021/0096776 A1 Apr. 1, 2021

(30) Foreign Application Priority Data

Sep. 30, 2019 (KR) .................. 10-2019-0120626
Mar. 31, 2020 (KR) .................. 10-2020-0038966

(51) Int. Cl.
*G06F 3/06* (2006.01)
*G06F 12/0875* (2016.01)

(52) U.S. Cl.
CPC .......... *G06F 3/0659* (2013.01); *G06F 3/0604* (2013.01); *G06F 3/067* (2013.01); *G06F 12/0875* (2013.01); *G06F 2212/1041* (2013.01)

(58) Field of Classification Search
CPC ............. G06F 11/1446; G06F 11/1448; G06F 11/1453; G06F 11/1471; G06F 12/0875;
(Continued)

(56) References Cited

U.S. PATENT DOCUMENTS 8,370,312 B1 * 2/2013 Sawhney ............ H04L 67/1097
707/694
8,682,955 B1 3/2014 Monden et al.
(Continued)

FOREIGN PATENT DOCUMENTS

KR 10-1212778 B1 12/2012
KR 10-2014-0128188 A 11/2014
(Continued)

*Primary Examiner* — Yong J Choe
(74) *Attorney, Agent, or Firm* — LRK Patent Law Firm

(57) ABSTRACT

An apparatus and method for processing sensitive data. The apparatus includes one or more processors and executable memory for storing at least one program executed by the one or more processors. The at least one program is configured to, in an unprotected data area, read sensitive data from a storage device and transmit the same to a protected data area using the sensitive-data storage endpoint of the protected data area; to, in the protected data area, process the sensitive data using at least one endpoint when a command for a sensitive-data service requested by a client device is received from the unprotected data area; and to, in the unprotected data area, transmit the result of processing the sensitive data to the client device.

10 Claims, 29 Drawing Sheets

(58) Field of Classification Search
CPC .. G06F 21/602; G06F 21/604; G06F 21/6218; G06F 21/6245; G06F 2201/815; G06F 2201/84; G06F 2212/1041; G06F 3/0604; G06F 3/061; G06F 3/062; G06F 3/0637; G06F 3/0649; G06F 3/0659; G06F 3/067; G06F 3/0685
See application file for complete search history.

(56) References Cited

U.S. PATENT DOCUMENTS

| | | |
|---|---|---|
| 9,274,958 B1 | 3/2016 | Korotaev et al. |
| 9,537,974 B2 | 1/2017 | McLean |
| 9,588,901 B2 | 3/2017 | Chahal et al. |
| 9,588,977 B1 | 3/2017 | Wang et al. |
| 9,619,429 B1 | 4/2017 | Wang et al. |
| 9,830,091 B2 | 11/2017 | Venkatesan et al. |
| 2007/0016792 A1* | 1/2007 | Allen ................... G06F 3/0489 713/182 |
| 2010/0161759 A1* | 6/2010 | Brand ................. H04L 67/1097 709/218 |
| 2014/0013045 A1 | 1/2014 | Crossland et al. |
| 2014/0173171 A1 | 6/2014 | Chen et al. |
| 2016/0112281 A1 | 4/2016 | Mason |
| 2017/0315930 A1 | 11/2017 | Hangud et al. |
| 2019/0065061 A1 | 2/2019 | Kim et al. |
| 2019/0121899 A1 | 4/2019 | Kim et al. |

FOREIGN PATENT DOCUMENTS

| | | |
|---|---|---|
| KR | 10-1924099 B1 | 11/2018 |
| KR | 10-2019-0045049 A | 5/2019 |

* cited by examiner

APPARATUS AND METHOD FOR MANAGING INTEGRATED STORAGE SUPPORTING HIERARCHICAL STRUCTURE

CROSS REFERENCE TO RELATED APPLICATIONS

This application claims the benefit of Korean Patent Applications No. 10-2019-0120626, filed Sep. 30, 2019, and No. 10-2020-0038966, filed Mar. 31, 2020, which are hereby incorporated by reference in their entireties into this application.

BACKGROUND OF THE INVENTION

1. Technical Field

The present invention relates generally to technology for managing integrated storage that supports a hierarchical structure, and more particularly to technology for managing integrated storage that supports the hierarchical structure of storage devices of cloud storage and non-cloud storage in a cloud-computing environment.

2. Description of Related Art

These days, the development of technology for cloud computing, which enables a user to rent and use a desired service without restrictions as to time and place, is accelerated, and market demand therefor is increasing. Cloud computing may provide a network, storage, and computing services desired by users over the Internet, without the need to construct private hardware and software for each user.

In the case of a storage system related to a data storage service, among cloud-computing techniques, a user may request to store data using only a secure and convenient service interface provided by the system. To this end, a cloud-integrated storage system, which stores data in storage in which on-premise storage and public cloud storage are integrated so as to appear as a single storage space, has been developed.

Particularly, the cloud-integrated storage system may manage and operate on-premise public storage that appears as a single storage space while making use of the advantages of both of on-premise storage possessed by companies and organizations and of public cloud storage provided by a cloud provider.

Using on-premise public storage appearing as a single storage space, the cloud-integrated storage system may provide a converged storage infrastructure service that secures both resilience and cost efficiency of storage space and ensures reliability and control over sensitive data.

Accordingly, the cloud-integrated storage system may improve the convenience of use of a cloud service, which is required in order to use the cloud service in various fields and to create new business models.

Trends of existing similar systems are as follows.

With regard to 'IDC 3rd Platform (real-time analysis, IoT, and AI computing)', the demand to construct and adopt a hybrid cloud-computing service is increasing in order to support operations.

Also, 'IDC 3rd Platform (real-time analysis, IoT, and AI computing)' aims to support the extension of computing resources by unifying various cloud models and to improve automation and computing environment management efficiency.

HP provides infrastructure management functions using a REST API based on an OpenStack structure and provides a Helion Eucalyptus platform, which is its own open-source system designed such that some services thereof are compatible with Amazon's AWS.

VMware released vCloud Hybrid Service (vCHS), which provides server, storage and network virtualization techniques in an integrated manner based on existing VMware virtualization and infrastructure.

Rackspace integrates a cloud server with SAN storage of companies with a focus on the extension of cloud infrastructure and supports data protection using Cisco ASA firewalls.

Avere FlashCloud of Avere Systems and StorSimple of MS have cloud storage gateway technology with storage tiering for differentiating local storage from cloud storage depending on the frequency of use of data in order to provide data backup, archiving, applications at a Tier 2 level, and a disaster recovery service.

Technology for managing the same data in both local storage and public storage through replication may be realized through copying in a cloud storage gateway. As such a cloud storage gateway, there is a cloud storage gateway solution of CTERA Networks. The corresponding solution additionally provides file distribution, file synchronization, and sharing services.

Cloud-integrated storage is a storage system for integrating on-premise storage and cloud storage into a single storage unit and managing the same. The cloud-integrated storage may automatically store data in on-premise storage and cloud storage by automatically distributing or moving the data therebetween based on the characteristics of the data. Also, it is possible to manually store data in specific on-premise storage or cloud storage in response to an instruction by a user.

Data stored in the storage is used for various data-processing services. However, when security-sensitive data, such as financial information, medical information, or personal information, is provided, the risk of data leakage is still present. Particularly, when such data is stored in the cloud, the risk of data leakage increases. This is because data leakage by people or data leakage using various hacking methods cannot be fundamentally prevented even though on-premise storage and cloud systems provide various security functions.

Data is stored in the storage after being encrypted for security. The encrypted data is secure even when the encrypted data is leaked because the encrypted data cannot be decrypted if there is no key. However, in order to run a data-processing service for the corresponding data, it is necessary to decrypt the encrypted data. When the decrypted data is leaked, sensitive data may be immediately exposed. Therefore, there is no method for fundamentally preventing data leakage in the existing system for providing a data-processing service for sensitive data.

Meanwhile, Korean Patent Application Publication No. 10-2019-0045049, entitled "Apparatus and method for managing integrated storage" discloses an apparatus and method for managing integrated storage that are configured to store data in a distributed manner and manage the data in order to store data in the integrated storage including on-premise storage and cloud storage.

SUMMARY OF THE INVENTION

An object of the present invention is to fundamentally prevent the leakage of sensitive data stored in storage while supporting a service for processing the sensitive data.

Another object of the present invention is to provide a sensitive-data-processing service by decrypting encrypted data stored in storage and to fundamentally prevent the leakage of sensitive data.

A further object of the present invention is to improve the performance of read/write operations in integrated storage in which cloud storage and on-premise storage are integrated.

Yet another object of the present invention is to enable cloud storage and on-premise storage included in integrated storage to provide a data storage service with the same performance.

Still another object of the present invention is to move user data based on the resilience and cost efficiency of storage space.

Still another object of the present invention is to support various types of cloud storage services, such as Amazon S3, MS Azure, and the like, thereby providing an integrated storage service that meets user requirements.

Still another object of the present invention is to enable cloud storage to be accessed at a speed close to the speed at which on-premise storage is accessed.

Still another object of the present invention is to provide a service interface through which a user is able to access cloud-integrated storage using various service protocols.

Still another object of the present invention is to provide various types of storage services, such as a storage service based on conventional files or blocks, a storage service based on objects, which is provided in recent cloud storage, and the like.

Still another object of the present invention is to ensure secure data transmission between on-premise storage and cloud storage, thereby guaranteeing the confidentiality of user data.

Still another object of the present invention is to prevent data loss caused by system errors.

Still another object of the present invention is to support a multi-tenant function for simultaneously running multiple cloud services.

Still another object of the present invention is to improve storage management performance by managing the storage devices of on-premise storage and public cloud storage in a hierarchical structure.

Still another object of the present invention is to reduce the risk of exposure of user data and to stimulate use of the computing resources of a public cloud.

In order to accomplish the above objects, an apparatus for managing integrated storage supporting a hierarchical structure according to an embodiment of the present invention may include one or more processors and executable memory for storing at least one program executed by the one or more processors. The at least one program may tier storage devices included in public cloud storage and on-premise storage depending on the characteristics of the storage devices, store data in the storage devices tiered depending on the characteristics of the storage devices, and relocate the data in the tiered storage devices depending on the characteristics of the data.

Here, the at least one program may manage the storage devices by classifying the storage devices into a performance tier, a capacity tier, and an archive tier.

Here, the at least one program may manage memory and flash storage at the performance tier.

Here, the at least one program may manage the on-premise storage at the capacity tier.

Here, the at least one program may manage the public cloud storage at the archive tier.

Here, the at least one program may store data managed in a storage device at the performance tier using a read cache and a write cache.

Here, the at least one program may store the location of data stored using the write cache as metadata.

Here, the at least one program may calculate the hash value of data stored using the read cache and store a pair comprising the data and the hash value.

Here, the at least one program may identify a time at which data managed in storage devices at the capacity tier and the archive tier is recorded, and may record a log according to the time.

Here, the at least one program may add information about the time to the end of the log.

Here, the at least one program may relocate the data in the tiered storage devices depending on the characteristics of the data.

Here, the at least one program may perform separate storage of metadata, protection of data communication, and data encryption.

Here, the at least one program may store encrypted data in the public cloud storage and separately store metadata pertaining to the encrypted data in the on-premise storage depending on the characteristics of the data.

Here, the at least one program may ensure highly reliable data transmission through SSL/TLS-based encryption when the on-premise storage and the public cloud storage communicate with each other. Data encryption may provide three types of AES (128, 192 and 256) for encryption of data stored in backend storage.

Here, the at least one program may enable the public cloud storage to access data in the on-premise storage using a virtual appliance and to provide a service.

In order to accomplish the above objects, a method for managing integrated storage supporting a hierarchical structure, performed by an apparatus for managing the integrated storage supporting a hierarchical structure, according to an embodiment of the present invention may include tiering storage devices included in public cloud storage and on-premise storage depending on the characteristics of the storage devices; storing data in the storage devices tiered depending on the characteristics of the storage devices; and relocating the data in the tiered storage devices depending on the characteristics of the data.

Here, tiering the storage devices may be configured to tier the storage devices included in the public cloud storage and the on-premise storage depending on the characteristics of the storage devices.

Here, tiering the storage devices may be configured to manage the storage devices by classifying the storage devices into a performance tier, a capacity tier, and an archive tier.

Here, tiering the storage devices may be configured to manage memory and flash storage at the performance tier.

Here, tiering the storage devices may be configured to manage the on-premise storage at the capacity tier.

Here, tiering the storage devices may be configured to manage the public cloud storage at the archive tier.

Here, storing the data in the storage devices tiered depending on the characteristics of the storage devices may be configured to store the data in the storage devices tiered depending on the characteristics of the storage devices.

Here, storing the data in the storage devices tiered depending on the characteristics of the storage devices may be configured to store data managed in a storage device at the performance tier using a read cache and a write cache.

Here, storing the data in the storage devices tiered depending on the characteristics of the storage devices may be configured to store the location of data stored using the write cache as metadata.

Here, storing the data in the storage devices tiered depending on the characteristics of the storage devices may be configured to calculate the hash value of data stored using the read cache and to store a pair comprising the data and the hash value.

Here, storing the data in the storage devices tiered depending on the characteristics of the storage devices may be configured to identify a time at which data managed in storage devices at the capacity tier and the archive tier is recorded and to record a log according to the time.

Here, storing the data in the storage devices tiered depending on the characteristics of the storage devices may be configured to add information about the time to the end of the log.

Here, relocating the data in the tiered storage devices depending on the characteristics of the data may be configured to relocate the data in the tiered storage devices depending on the characteristics of the data.

Here, relocating the data in the tiered storage devices depending on the characteristics of the data may be configured to perform separate storage of metadata, protection of data communication, and data encryption.

Here, relocating the data in the tiered storage devices depending on the characteristics of the data may be configured to store encrypted data in the public cloud storage and to separately store metadata pertaining to the encrypted data in the on-premise storage depending on the characteristics of the data.

Here, relocating the data in the tiered storage devices depending on the characteristics of the data may be configured to ensure highly reliable data transmission through SSL/TLS-based encryption when the on-premise storage and the public cloud storage communicate with each other. Data encryption may provide three types of AES (128, 192 and 256) for encryption of data stored in backend storage.

Here, relocating the data in the tiered storage devices depending on the characteristics of the data is configured to enable the public cloud storage to provide an application service by accessing data in the on-premise storage using a virtual appliance.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
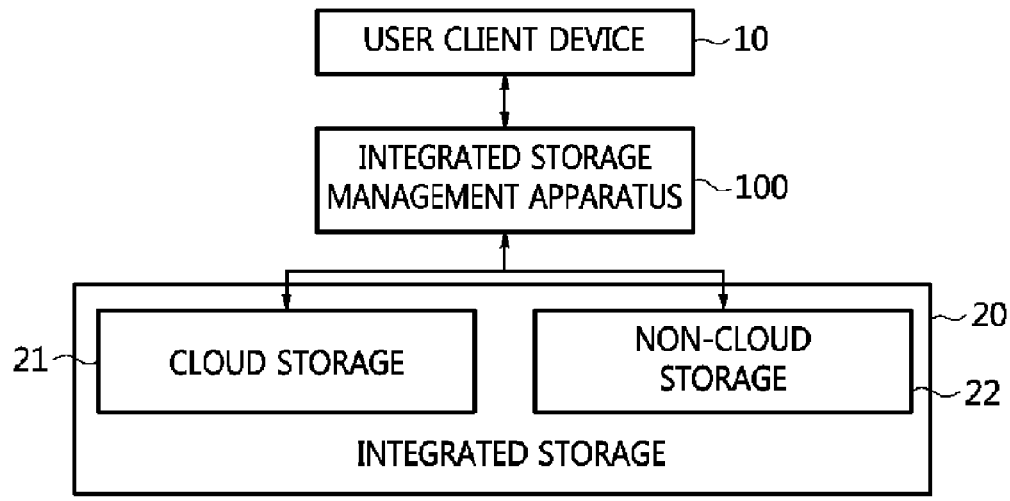
FIG. 1 is a block diagram that shows an integrated storage system according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram that shows an integrated storage system according to an embodiment of the present invention.

Referring to FIG. 1, the integrated storage system according to an embodiment of the present invention may include a user client device 10, an integrated storage management apparatus 100, and integrated storage 20.

The user client device 10 enables a user to request and receive the service of the integrated storage 20 through the integrated storage management apparatus 100.

The integrated storage 20 may include cloud storage 21 and non-cloud storage 22.

The cloud storage 21 may be public cloud storage provided by a provider.

The non-cloud storage 22 may be on-premise storage possessed by companies and organizations.

The integrated storage management apparatus 100 may manage and operate the cloud storage 21 and the non-cloud storage 22 included in the integrated storage 20 so as to appear as a single storage unit.

Here, the integrated storage management apparatus 100 may provide a cloud service with consistent performance such that a user is not aware of whether access is made to the cloud storage 21 or the non-cloud storage 22.

Figure 2:
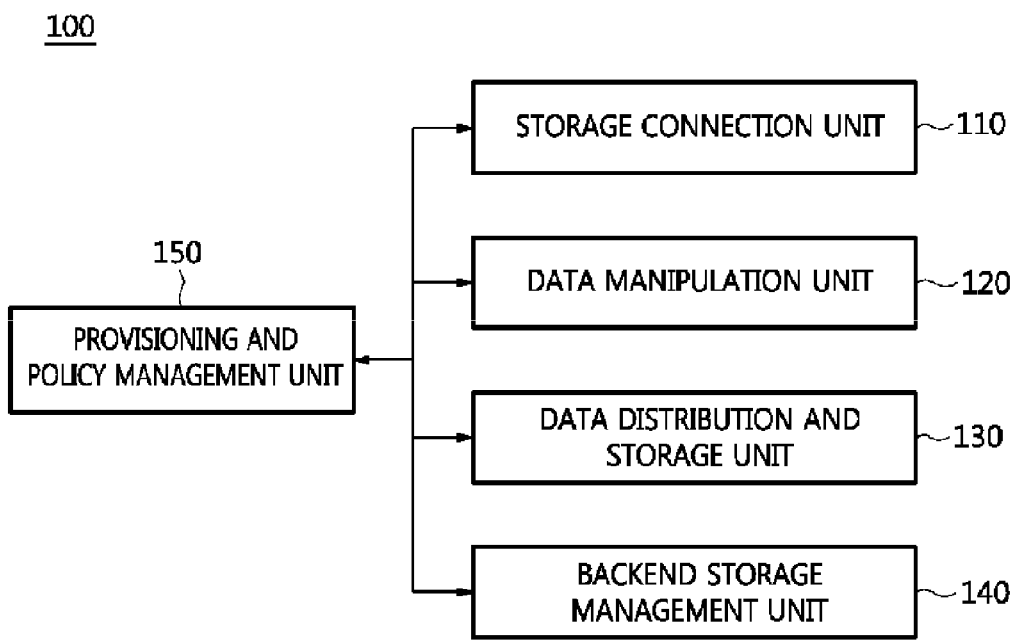
FIG. 2 is a block diagram that shows an apparatus for managing integrated storage according to an embodiment of the present invention.
Figure 3:
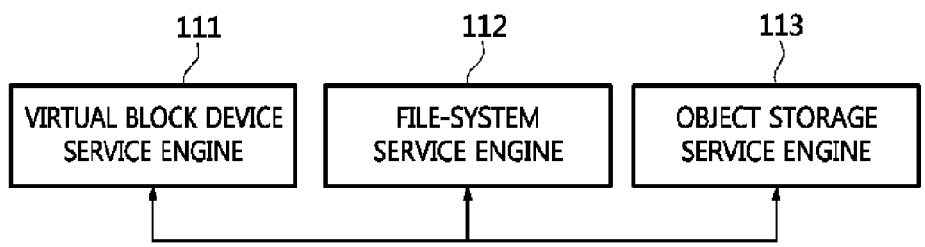
FIG. 3 is a block diagram that specifically shows an example of the storage connection unit illustrated in FIG. 2.
Figure 4:
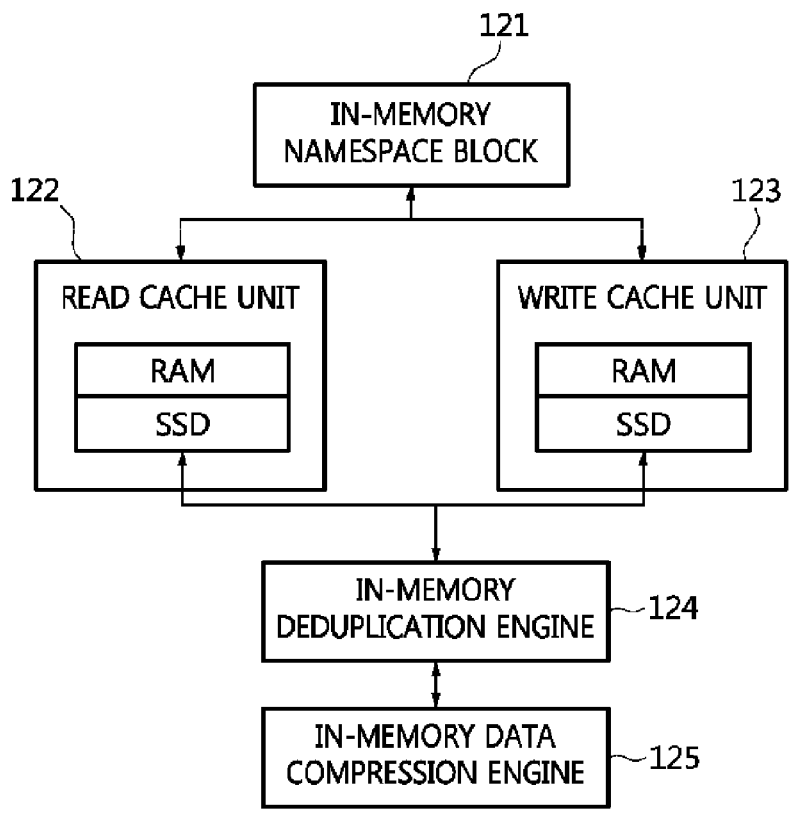
FIG. 4 is a block diagram that specifically shows an example of the data manipulation unit illustrated in FIG. 2.

FIG. 2 is a block diagram that shows an apparatus for managing integrated storage according to an embodiment of the present invention. FIG. 3 is a block diagram that specifically shows an example of the storage connection unit illustrated in FIG. 2. FIG. 4 is a block diagram that specifically shows an example of the data manipulation unit illustrated in FIG. 2.

Referring to FIG. 2, the integrated storage management apparatus 100 according to an embodiment of the present invention includes a storage connection unit 110, a data manipulation unit 120, a data distribution and storage unit 130, a backend storage management unit 140, and a provisioning and policy management unit 150.

The storage connection unit 110 may provide the service of the integrated storage 20 to a user by operating in conjunction with the integrated storage 20.

Referring to FIG. 3, the storage connection unit 110 may include a virtual block device service engine 111, a file-system service engine 112, and an object storage service engine 113.

Here, the storage connection unit 110 may provide the function of processing the protocols of block storage, file storage, and object storage, I/O interfaces, and an acceleration function for improving the protocol-processing function and the I/O interfaces.

Here, the storage connection unit 110 may basically provide a user with block-device and file-system services, which are conventional storage service interfaces, and may also provide an object storage interface, which has recently emerged.

The data manipulation unit 120 may provide a single storage view of the entire storage system by providing a virtual disk pool to a user.

That is, the data manipulation unit 120 may form a virtual disk pool using a fast storage resource, and may provide a user with storage units as a virtual disk.

Accordingly, even though data is physically distributed across various types of storage units, a user may be provided with a single storage configuration regardless of the location at which the data is actually stored.

Here, the data manipulation unit 120 may provide data management functions, such as snapshots, fast replication, and distributed transaction logs.

Here, the data manipulation unit 120 may provide a write buffer function or a read cache function to a corresponding user when a data write operation or a data read operation is performed.

Here, the data manipulation unit 120 may guarantee fast response time to a user by using memory, an SSD, and a PCIe flash card.

Here, the data manipulation unit 120 may provide data read/write caches using a RAM disk in order to provide the service of the integrated storage.

The data manipulation unit 120 may provide a cache function for the data stored in public cloud storage (cloud storage 21). Because the data stored in the public cloud storage is transmitted over the Internet, the data access speed is slower than that of on-premise storage (non-cloud storage 22).

Also, because data is automatically distributed to public cloud storage in the state in which a user is not aware of the distribution, a function of quickly accessing the data stored in the public cloud storage is required.

The data manipulation unit 120 caches the data stored in the public cloud storage to a storage device inside the cloud-integrated storage operating platform, whereby the data in the public cloud storage may be accessed at a speed close to the speed at which data in the on-premise storage is accessed.

Referring to FIG. 4, the data manipulation unit 120 may include an in-memory namespace block 121, a read cache unit 122, a write cache unit 123, an in-memory deduplication engine 124, and an in-memory data compression engine 125.

The in-memory namespace block 121 may store information that is periodically and repeatedly read and written in order to access actual data, and may guarantee fast access speed.

Here, the in-memory namespace block 121 stores the information required for data access in high-speed main memory, thereby providing a data storage and management function.

Here, the in-memory namespace block 121 is a volatile storage medium, and has a limitation as to capacity. Therefore, the namespace block is backed up in real time, and the namespace block that is backed up may perform a high availability function through clustering of multiple nodes (virtual machines or physical servers).

Here, in order to provide fast performance in the integrated storage structure, the data manipulation unit 120 may simultaneously run the in-memory deduplication engine 124 and the in-memory data compression engine 125, which are data compression structures, along with the in-memory namespace block 121.

Here, the data manipulation unit 120 is required in order to guarantee fast access to a global namespace, which is necessary for accessing actual data, and may provide a high-speed processing method in order to quickly store and read data.

Each of the read cache unit 122 and the write cache unit 123 may be in the form of a RAM disk, and may be configured as a single disk, which includes RAM, corresponding to main memory, and a Solid-State Drive (SSD).

The read cache unit 122 and the write cache unit 123 may back up data in the SSD in real time based on the characteristics of volatile memory.

Here, when the RAM-based cache area is exhausted, the read cache unit 122 and the write cache unit 123 may automatically switch to the SSD-based cache area.

Here, when a user performs a write operation, the read cache unit 122 and the write cache unit 123 may return the result immediately after writing in a memory area for a fast response thereto.

The in-memory deduplication engine 124 and the in-memory data compression engine 125 may correspond to the data distribution and storage unit 130, which will be described later.

That is, the data distribution and storage unit 130 may be included in the data manipulation unit 120.

The in-memory deduplication engine 124 may provide the function of storing data in multiple physical devices in a distributed manner in order to prevent data loss.

Here, the in-memory deduplication engine 124 applies error detection and recovery coding for detecting the occurrence of errors in data and correcting the errors, thereby responding to data and system errors.

The in-memory data compression engine 125 compresses the actual data to be stored in the backend storage, thereby reducing the size of the data. Particularly, when data is expected to be stored in public cloud storage, the in-memory data compression engine 125 reduces the size of the data through compression, thereby reducing the size of the data to be transmitted through a network.

The data distribution and storage unit 130 may provide an optimized function in order to always access data with the minimum overhead when the received data is written.

Here, the data distribution and storage unit 130 may break each object into multiple fragments in order to efficiently manage data, and may store the fragments in another node or a data center in a distributed manner in order to improve reliability.

Here, the data distribution and storage unit 130 may optionally encrypt or compress the fragment and reflect a policy decision therefor.

Here, the data distribution and storage unit 130 applies error detection and recovery coding for detecting the occurrence of errors in data and correcting the errors, thereby responding to data and system errors.

The backend storage management unit 140 may provide the storage interfaces of the cloud storage 21 and the non-cloud storage 22 in order to store the final data, created in the data distribution and storage unit 130, in the final resource.

Here, the backend storage management unit 140 may provide the function of automatically or manually storing data using tiering based on performance, time, and the frequency of use according to the policy of data distribution storage tiers.

Here, the backend storage management unit 140 may provide the function of automatically distributing and storing data in various storage tiers.

Here, the backend storage management unit 140 may tier various types of storage units based on the characteristics of the provided storage.

Here, the backend storage management unit 140 may store initially created data in high-speed storage, move the data to a lower tier of storage when the data is less frequently accessed, and finally store the data in the public cloud storage.

Here, the backend storage management unit 140 may automatically move data between various storage tiers depending on the characteristics of the data.

The provisioning and policy management unit 150 may function to manage the respective tiers and a user-based policy. Here, the provisioning and policy management unit 150 may provide a hierarchical interface for provisioning of a disk requested by a user.

Here, in addition to the data to be stored in the backend storage, metadata for managing and accessing the same is required. As the metadata according to the present invention, client metadata, which is created while a user is using the client device 10 or which is required for the interface between the user client device 10 and the integrated storage (integrated cloud management apparatus) 20, data management metadata required for data manipulation, and storage management metadata used for the backend storage may be used.

Figure 5:
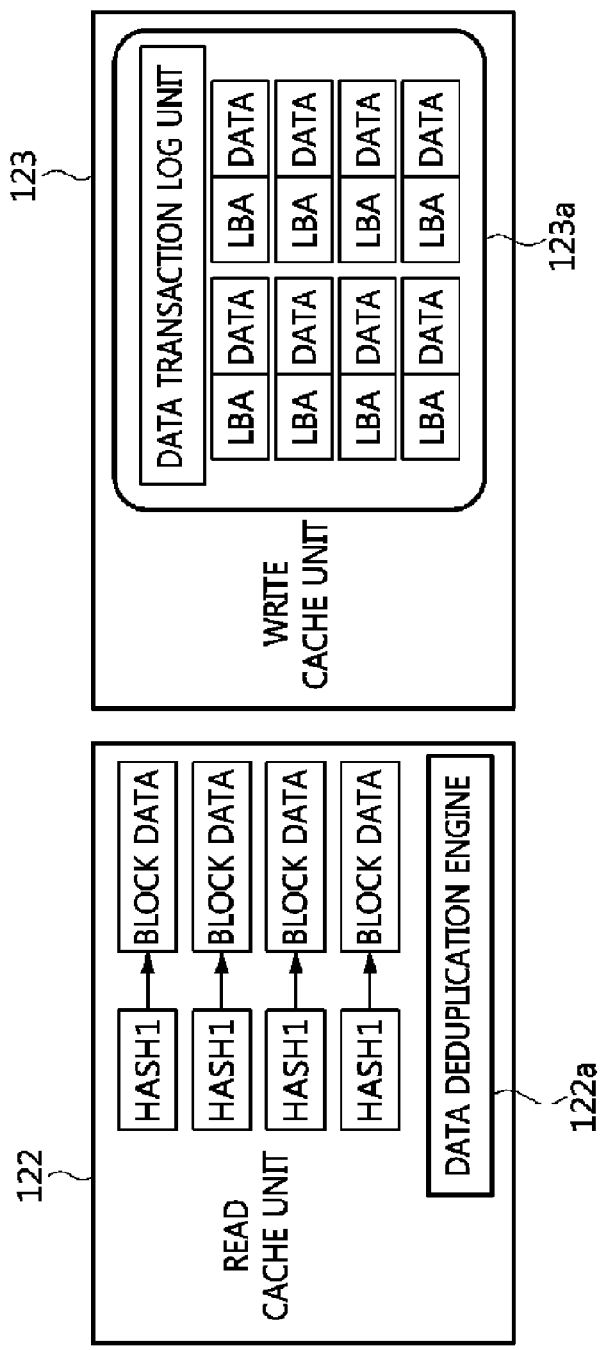
FIG. 5 is a view that shows an example of a RAM disk according to an embodiment of the present invention.

FIG. 5 is a view that shows an example of a RAM disk according to an embodiment of the present invention.

Referring to FIG. 5, the read cache unit 122 and the write cache unit 123, each of which is the RAM disk of the data manipulation unit 120, are specifically illustrated.

The read cache unit 122 distributes hashes to block data using a data deduplication engine 122a.

The write cache unit 123 manages a log for data recovery in the same node or another node connected therewith over a network using a data transaction log unit 123a in preparation for the case in which data stored in a write cache is lost due to a system failure.

The log may save the location of data in a block and the hash value thereof, and may be maintained until the data is stored in the backend storage.

Synchronization between the write cache and the transaction log may be performed through asynchronous synchronization, or may be performed whenever data is generated in response to a request to write the data, the asynchronous synchronization being performed at certain intervals or when a log queue reaches a certain size. The block located in the write cache may be synchronized to the transaction log node under a certain condition. When the data of the block has been stored in the backend storage over time, the block of the write cache and the block of the transaction log node corresponding thereto may be deleted therefrom because the blocks are removed from the targets to be managed.

Figure 6:
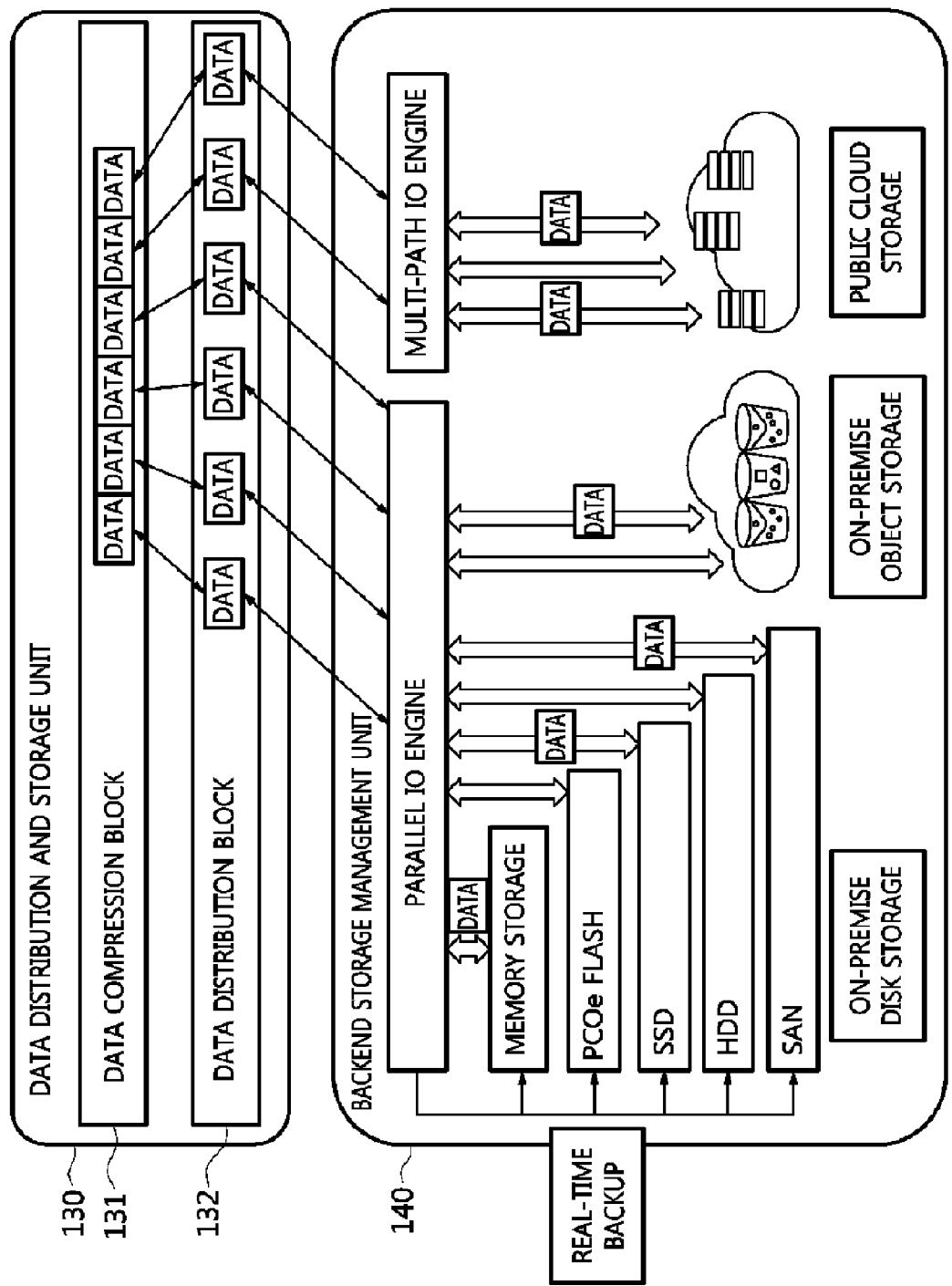
FIG. 6 is a view that specifically shows the operations of a data distribution and storage unit and a backend storage management unit according to an embodiment of the present invention.

FIG. 6 is a view that specifically shows the operations of a data distribution and storage unit and a backend storage management unit according to an embodiment of the present invention.

Referring to FIG. 6, the data compression block 131 in the data distribution and storage unit 130 may perform the process of reducing the size of data by compressing the actual data to be stored in the backend storage. Particularly, when data is expected to be stored in the public cloud storage, the data compression block 131 reduces the size of the data through compression, thereby reducing the size of the data to be transmitted over a network.

The data distribution block 132 may provide the function of storing data in multiple physical devices in a distributed manner in order to prevent data loss.

Here, the data distribution block 132 applies error detection and recovery coding for detecting the occurrence of errors in data and correcting the errors, thereby responding to data and system errors.

The backend storage management unit 140 may include an HDD, SAS, iSCSI storage, public cloud storage, and the like, and may provide an interface function for finally storing data in the backend storage.

Here, the backend storage management unit 140 provides data operations and a high-availability service for the connected storage using various types of storage units ranging from memory storage for guaranteeing fast response time to cloud storage for managing a large capacity of data through a data distribution policy, a parallel I/O engine, and a multi-path I/O engine.

Here, the backend storage management unit 140 may store data in storage in the same node or storage in multiple nodes configured as a cluster such that the data is distributed, and may adjust the data size and the number of nodes across which the data is distributed, whereby data loss caused by system errors may be prevented.

The backend storage management unit 140 provides the function of automatically distributing and storing data in various storage tiers. Here, based on the characteristics of the provided storage, various types of storage units may be tiered. Initially, created data is stored in high-speed storage, the data is moved to a lower tier of storage when the data is less frequently accessed, and the data is finally stored in the public cloud storage. The backend storage management unit 140 may automatically move data between various storage tiers depending on the characteristics of the data.

Figure 7:
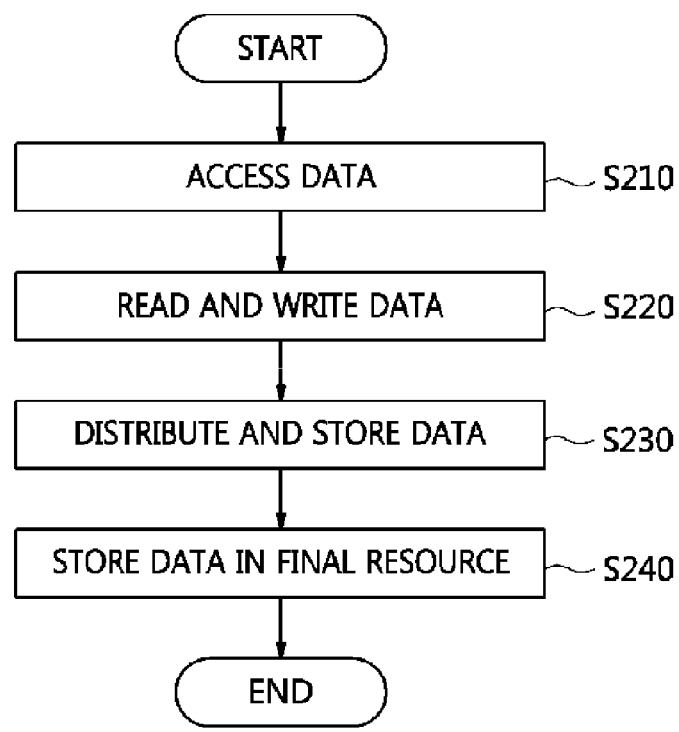
FIG. 7 is a flowchart that shows a method for managing integrated storage according to an embodiment of the present invention.

FIG. 7 is a flowchart that shows a method for managing integrated storage according to an embodiment of the present invention.

Referring to FIG. 7, in the method for managing integrated storage according to an embodiment of the present invention, first, data may be accessed at step S210.

That is, at step S210, data may be accessed in order to provide the service of integrated storage 20 to a user through a connection with the integrated storage 20.

Here, at step S210, a virtual disk pool is provided to the user, whereby a single storage view of the entire storage system may be provided.

Also, in the method for managing integrated storage according to an embodiment of the present invention, data may be read or written at step S220.

That is, at step S220, data read/write caches may be provided using a RAM disk in order to provide the service of the integrated storage.

Here, at step S220, data stored in the public cloud storage is cached to a storage device inside the cloud-integrated storage operating platform, whereby the data in the public cloud storage may be accessed at a speed close to the speed at which data in on-premise storage is accessed.

Here, at step S220, data read and write operations are performed using a RAM disk configured as a single disk, which includes RAM, corresponding to main memory, and a Solid-State Drive (SSD). Here, when the RAM-based cache area is exhausted, it may be automatically switched to the SSD-based cache area.

Also, in the method for managing integrated storage according to an embodiment of the present invention, data may be distributed and stored at step S230.

That is, at step S230, the data object may be distributed and stored, and the distributed object may be encrypted and compressed.

Here, at step S230, error detection and recovery coding for detecting the occurrence of errors in data and correcting the errors is applied, whereby it is possible to respond to data and system errors.

Also, in the method for managing integrated storage according to an embodiment of the present invention, data may be stored in the final resource at step S240.

That is, at step S240, the final data created at step S230 may be stored in the final resource.

Here, at step S240, the function of automatically or manually storing data may be provided using tiering based on performance, time, and the frequency of use according to the policy of data distribution storage tiers.

Here, at step S240, the function of automatically distributing and storing data in various storage tiers may be provided.

Here, at step S240, various types of storage units may be tiered based on the characteristics of the provided storage.

Here, at step S240, initially created data is stored in high-speed storage, the data is moved to a lower tier of storage when the data is less frequently accessed, and the data may be finally stored in the public cloud storage.

Here, at step S240, data may be automatically moved between various storage tiers depending on the characteristics of the data.

Figure 8:
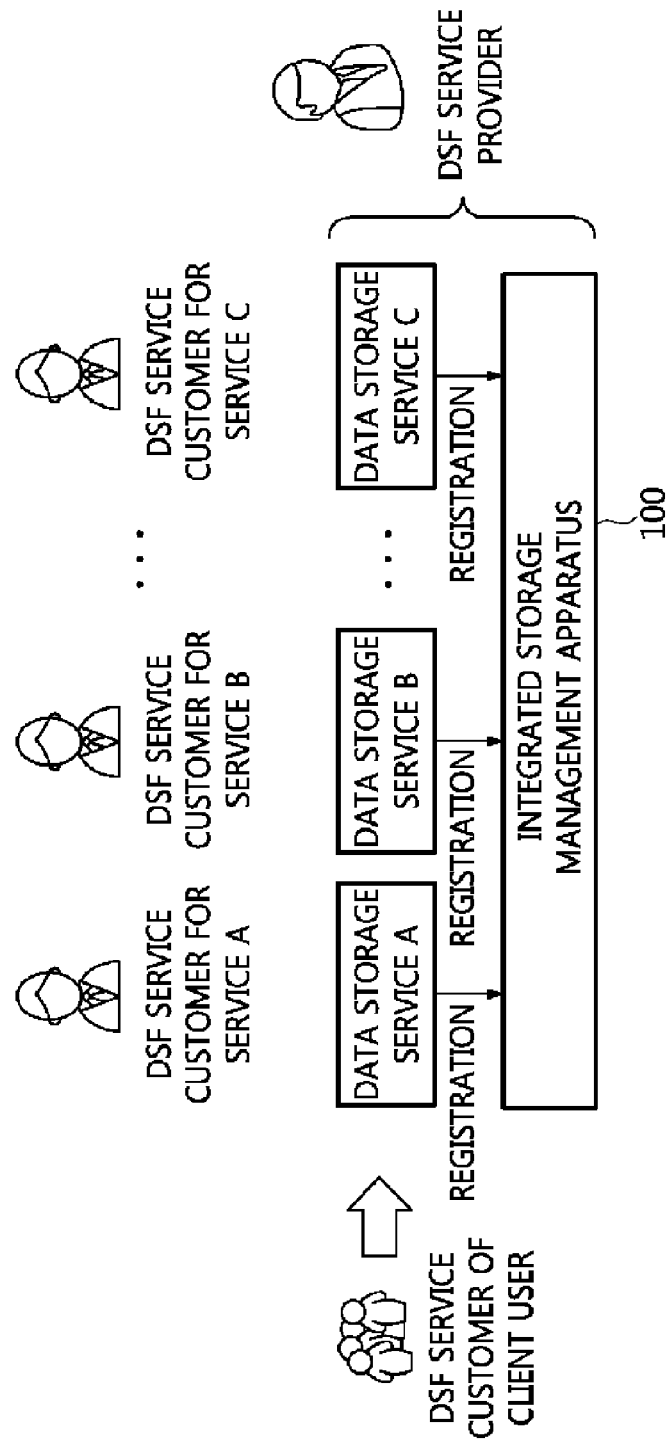
FIG. 8 is a view that shows the relationship between a service provider and an apparatus for managing integrated storage according to an embodiment of the present invention.

FIG. 8 is a view that shows the relationship between a service provider and an apparatus for managing integrated storage according to an embodiment of the present invention.

Referring to FIG. 8, the integrated storage management apparatus 100 according to an embodiment of the present invention may enable multiple Data Storage Federation (DSF) service providers for services A to N to register data storage services A to N in the integrated storage management apparatus 100.

Here, a DSF service administrator may provide the registered multiple storage services to users through the integrated storage management apparatus 100.

Here, a DSF service customer of client user may be provided with the multiple storage services using the integrated storage management apparatus 100.

Here, the integrated storage management apparatus 100 may manage the integrated storage 20 based on multi-tenant architecture in order to provide the multiple storage services.

Figure 9:
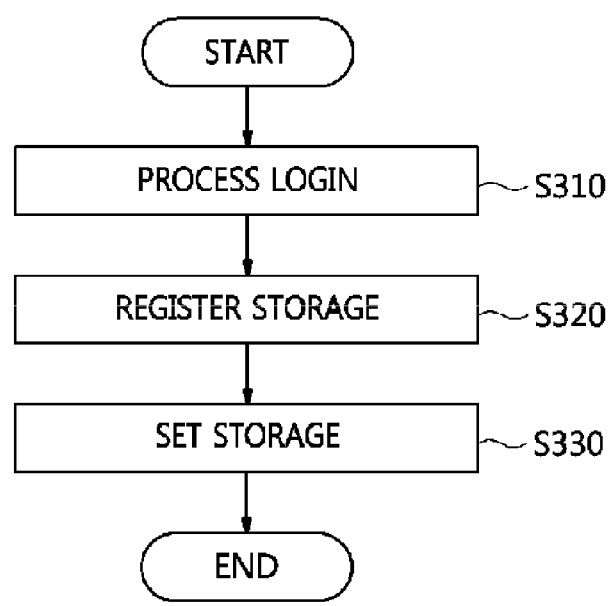
FIG. 9 is a flowchart that shows an integrated storage management method for registering a storage service according to an embodiment of the present invention.

FIG. 9 is a flowchart that shows an integrated storage management method for registering a storage service according to an embodiment of the present invention.

Referring to FIG. 9, in the integrated storage management method for registering a storage service according to an embodiment of the present invention, first, the integrated storage management apparatus 100 may process the login of a provider at step S310.

Here, at step S310, in order to register a storage service, the provider may log on to the integrated storage management apparatus 100 using a previously registered ID and password.

Here, at step S310, when the ID and password of the provider, which are necessary in order to log in, are not registered, a new ID and password may be created.

Also, in the integrated storage management method for registering a storage service according to an embodiment of the present invention, a storage service may be registered in the storage at step S320.

That is, at step S320, cloud storage 21 and non-cloud storage 22 are checked in order to register a storage service, and the storage service may be registered.

Here, at step S320, a registration method for registering a storage service may be provided to the provider through a GUI.

Here, at step S320, a storage service name, storage specifications (the size, whether caching is supported, the number of tiers, encryption, whether on-premise storage is supported, and the like), a data storage service protocol, the name and type of cloud storage, and the like are input from the provider through the GUI, whereby the service may be registered in the storage corresponding to the input information.

Here, the information input through the GUI may be registered in advance when a new provider registers an ID and password.

Also, in the integrated storage management method for registering a storage service according to an embodiment of the present invention, storage may be configured at step S330.

That is, at step S330, virtual storage corresponding to the storage in which the storage service is registered may be created.

Here, at step S330, the virtual storage may be registered in a virtual disk pool, and a single storage view for providing the storage service may be provided to a user through the virtual disk pool.

Figure 10:
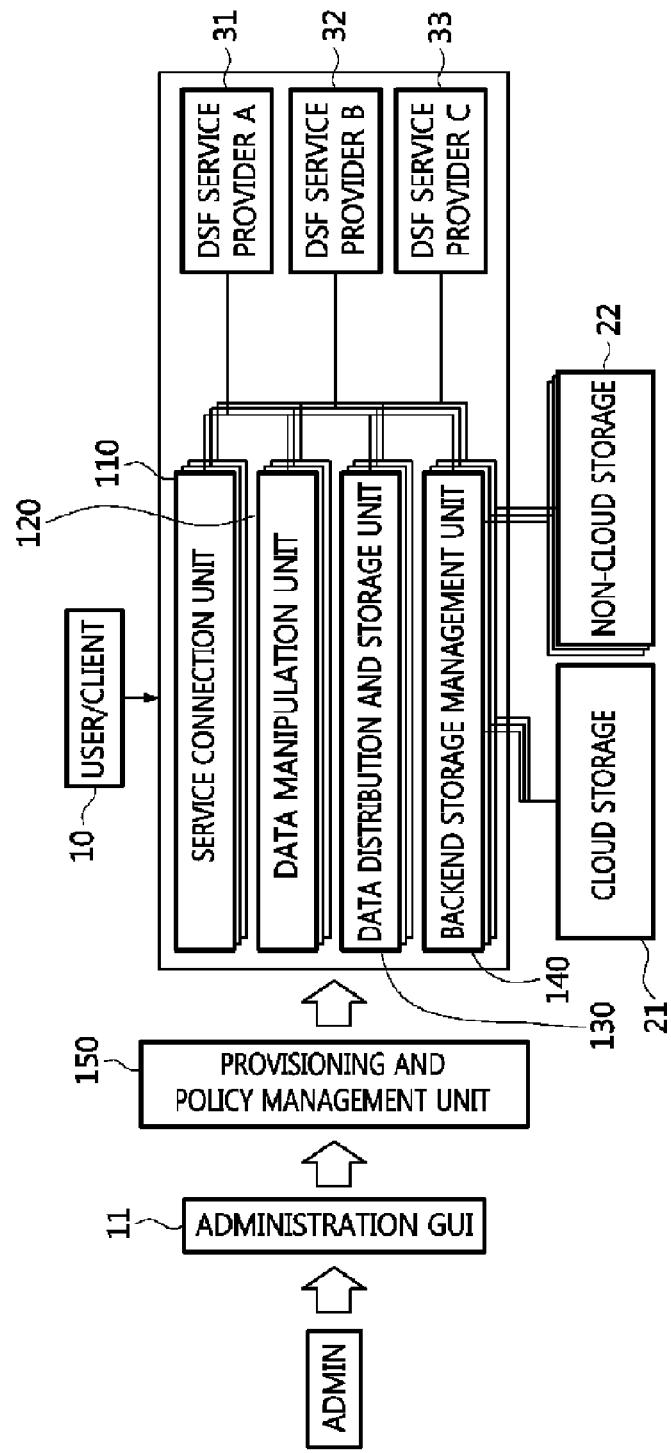
FIG. 10 is a block diagram that shows an apparatus for managing integrated storage according to an embodiment of the present invention.

FIG. 10 is a block diagram that shows an apparatus for managing integrated storage according to an embodiment of the present invention.

Referring to FIG. 10, the apparatus for managing integrated storage according to an embodiment of the present invention is configured to support multi-tenant architecture by including as many storage connection units 110, as many data manipulation units 120, as many data distribution and storage units 130, and as many backend storage management units 140 as the number of storage services registered by DSF service providers A to C. Here, the respective units are the components or main configurations of each layer.

That is, the integrated storage management apparatus 100 may support a multi-tenant function for simultaneously running multiple services.

Here, a provisioning and policy management unit 150 may provide an administration GUI to an administrator (Admin), and may provide and manage a multi-tenant-based integrated storage service.

The storage connection unit 110 and the data manipulation unit 120 may perform data management.

Here, the storage connection unit 110 may provide a user with an interface for the virtual data storage to be used as a single virtual storage unit.

Here, the storage connection unit 110 may provide a user access mechanism for using the single virtual storage unit.

Here, the user access mechanism may vary depending on the type of the single virtual storage unit.

Here, the storage connection unit 110 may provide the protocol or I/O interface of a single virtual volume along with a virtual block device, a file system, and object storage.

Here, the storage connection unit 110 may provide protocol performance acceleration.

Also, the interface provided by the storage connection unit 110 may be a direct interface (that is, an object or block storage interface) or a proxy interface for configuring various types of storage interfaces with a software program.

Here, the software program may include a software agent, a daemon, a web worker, and a RESTful API for an interface with the integrated storage 20.

Here, the proxy interface may automatically detect an interface with the software program and connect the integrated storage 20 therewith.

Here, the storage connection unit 110 may provide a user interface for the user client device 10 in order to use a single virtual volume.

The user interface may include a graphical user interface, a web application, or a specific client program for enabling the user client device 10 to access a specific virtual volume.

Here, the storage connection unit 110 may provide translation between the data manipulation unit 120 and the corresponding interface of the integrated storage device 20.

The corresponding interface includes an API, an I/O interface, and the like.

Here, the storage connection unit 110 may provide the user client device 10 with a secure access mechanism for using a single virtual volume.

Here, the storage connection unit 110 may register the requirements of the user client device 10.

The requirements of the user client device 10 may include a data storage capacity, an access mechanism, the storage type of a single virtual volume, a policy, and the like.

Here, the storage connection unit 110 may provide a seamless connection with the interface of the integrated storage 20 in order to smoothly communicate with the integrated storage 20.

Here, the data manipulation unit 120 may provide the integrated storage 20 as virtual data storage regardless of the location at which the data is actually stored.

Here, the data manipulation unit 120 may convert the data to be stored in the single virtual storage unit through at least one of fragmentation, encryption, and compression, and may then store the same.

Here, the data manipulation unit 120 may provide the single virtual storage view of the integrated storage 20 as a virtual storage pool.

Here, the data manipulation unit 120 may provide a write buffer function or a read cache function to the user client device 10.

Here, the data manipulation unit 120 may reduce a read response time and a write response time using memory, an SSD, a Peripheral Component Interconnect express (PCIe) flash card, or the like.

Here, the data manipulation unit 120 may compensate for the fact that access speed is lower than that of on-premise storage by using read and write caches.

The read and write caches may improve the performance of storage and a device for storing data, and may be used in various devices for high-speed cache operations.

The various devices for high-speed cache operations may be main memory, a RAM-based disk, an SSD, and the like.

For high-speed access, the hierarchical structure of a cache may be extended to main memory. Also, due to the limited capacity of main memory, an approach used in an SSD may be used therefor. That is, when the RAM-based cache area is exhausted, the RAM-based cache area may automatically switch to an SSD-area cache. When the user client device 10 performs a write operation, the write operation may be performed in the memory area for a fast response to the write operation.

Here, the data manipulation unit 120 may provide data management for snapshots, fast replication, and distributed transaction logs.

Here, the data manipulation unit 120 may provide the user client device 10 with the execution of data operations such as creating, reading, updating, and deleting (CRUD).

The CRUD data operations include creating, reading, updating and deleting data.

Here, the data manipulation unit 120 may provide data retrieval for the data of the user client device 10 using a query to search a global registry.

Here, the data manipulation unit 120 checks the sharing state of DSF data and updates the data-sharing state in the global registry, thereby providing a shared-data operation.

Data sharing may mean that the same data can be shared during data manipulation.

The data-sharing state may be information about whether data is shared.

Here, the data manipulation unit 120 may save data storage space through data deduplication.

Here, the data manipulation unit 120 may provide encryption/decryption of data in order to transmit the data to the integrated storage 20.

Here, the data manipulation unit 120 may provide recovery of the data of the user client device 10 in the event of a system failure.

Data recovery is configured to reconstruct the most recently used data of the user client device 10, whereby data loss due to storage and network connection errors may be prevented.

Here, the data manipulation unit 120 may provide migration of data to the available integrated storage 20 for the resilience and cost efficiency of the storage space.

Data migration for the resilience and cost efficiency of the data storage space may be automatically performed without user intervention or in the state in which a user is not aware of the data migration.

Here, the data manipulation unit 120 may provide a data validity check for data manipulation in order to check data integrity.

Here, the data manipulation unit 120 may support the consistency of the data of the user client device 10 for the replicated data.

Data consistency may indicate that the data manipulation unit 120 correctly backs up the current data in order to reconstruct the data of the user client device 10 in the event of a storage failure.

Here, the data manipulation unit 120 may provide data transparency for the user client device 10.

Data transparency may mean access to the data without knowing the location of the user client device 10.

Here, the data manipulation unit 120 may provide the backup of a global namespace for high availability.

The backup of the global namespace is synchronized with actual data, and the global namespace that is backed up may provide a high-availability function through clustering of multiple nodes (virtual computers or physical servers).

Here, the data manipulation unit 120 may add a single virtual volume in response to user requirements for block-based storage, file-based storage or other cloud storage.

The data distribution and storage unit 130 may perform data distribution.

Here, the data distribution and storage unit 130 may distribute data in order to store the data in the integrated storage 20, including on-premise storage and cloud storage.

Here, the data distribution and storage unit 130 may provide optimization for ensuring the minimum overhead while data is being written to the integrated storage 20.

Here, the data distribution and storage unit 130 may provide data fragmentation in order to distribute and store data in the integrated storage 20.

Data fragmentation is a method for distributing and storing user data in other storage, nodes, or data centers in order to efficiently manage the data and to improve stability.

Here, the data distribution and storage unit 130 may provide encryption, decryption, compression, and decompression of data.

Here, encryption and compression may be considered depending on user requirements.

Also, the data distribution and storage unit 130 may support a file itself and the content thereof as data.

The type of file content may be any one of structured data, semi-structured data, and unstructured data.

Here, the data distribution and storage unit 130 may support aggregation of data distributed across local storage units of the multiple providers of integrated storage 20 using corresponding APIs.

Here, the data distribution and storage unit 130 may manage the data of the user client device 10 with a focus on the resilience and cost efficiency of the storage space.

For example, data movement for the resilience and cost efficiency of the data storage space may be automatically performed without user intervention or in the state in which a user is not aware of the data movement.

Here, the user client device 10 may be provided with the integrated cloud storage service with the same performance without knowing whether the data is stored in the on-premise storage 22 or the cloud storage 21.

Here, the data distribution and storage unit 130 may verify a service provider in order to integrate the data of the user client device 10.

The backend storage management unit 140 may perform storage management.

Here, the backend storage management unit 140 may connect to the integrated storage 20 in order to store the distributed data, and may provide storage-tiering information pertaining to the data to be stored.

Here, the storage-tiering information may vary depending on the performance of the storage, the time during which the data is used, and the frequency with which the data is accessed.

Here, the backend storage management unit 140 may provide storage tiering for tiering data depending on the performance of the storage, the time during which the data is used, and the frequency with which the data is accessed.

Storage tiering may be the process of deploying data so as to be distributed across multiple storage tiers using a hierarchical method.

Here, the backend storage management unit 140 may automatically move data between various storage tiers depending on the characteristics of the data.

When data is initially created, the data may be stored in high-speed storage. When the data is less frequently accessed, the data may be moved to low-speed storage.

Here, the backend storage management unit 140 may simultaneously access multiple data storage providers in order to aggregate distributed data.

Here, the backend storage management unit 140 may support the function of delegating permissions to access the integrated storage 20 to the user client device 10.

The provisioning and policy management unit 150 may provide the configuration and control of logical components.

Here, the provisioning and policy management unit 150 may provide management of a policy for data storage and data manipulation.

The data storage policy may include backups, snapshots, scaling, recovery, data caching, thin provisioning, tiering, storage types (a file, a block, an object, and the like), and the like.

Here, the policy management unit 150 may manage the policy of data manipulation for acceleration, the policy of data manipulation for efficiency of data storing, the policy of storage tiering, the policy of data manipulation for protection, and the policy for performance enhancement.

Here, the data storage policy may be configured by default, and may be reconfigured in response to a user request. Also, the data storage policy may be dependent on the policy of the integrated storage 20.

The reconfigured policy is the policy reconfigured by the provisioning and policy management unit 150 when the integrated storage 20 does not support its own policy.

The data manipulation policy may include supporting data-sharing, reading/writing, replication, data migration, fragmentation, encryption, compression, deduplication, and the like.

Here, the data manipulation policy may select a non-sharing mode or a sharing mode, including read-only, write, replication options, write options, and the like.

Here, the provisioning and policy management unit 150 may provide a single virtual volume to the virtual storage pool.

Here, the provisioning and policy management unit 150 may ensure the confidentiality of the data of the user client device 10 by supporting a security policy (e.g., data encryption) for data transmission.

Here, the provisioning and policy management unit 150 may prevent data loss, caused by errors in the storage structure based on distributed storage, and may provide data recovery in the event of a system error.

Also, the provisioning and policy management unit 150 may share data operation metadata with the storage connection unit 110, the data manipulation unit 120, the data distribution and storage unit 130, and the backend storage management unit 140.

The data operation metadata is a description that is necessary in order to perform data operations. The data operation metadata may include the attributes of a virtual storage pool and a single virtual volume. The data operation metadata may include transaction logs about read/write caching, snapshots, replication, fragmentation, and the like, and DSF data attributes.

The backend storage management unit 140 may share storage management metadata with the cloud storage 21 and the non-cloud storage 22 of the integrated storage 20.

The storage management metadata is a description that is necessary in order to manipulate a storage area. The storage management metadata may include the location of the integrated storage 20, the interface thereof, an API for manipulating customer data, a read/write speed, a storage capacity, and the like.

The customer metadata may be created by a customer in order to configure a customer environment.

Figure 11:
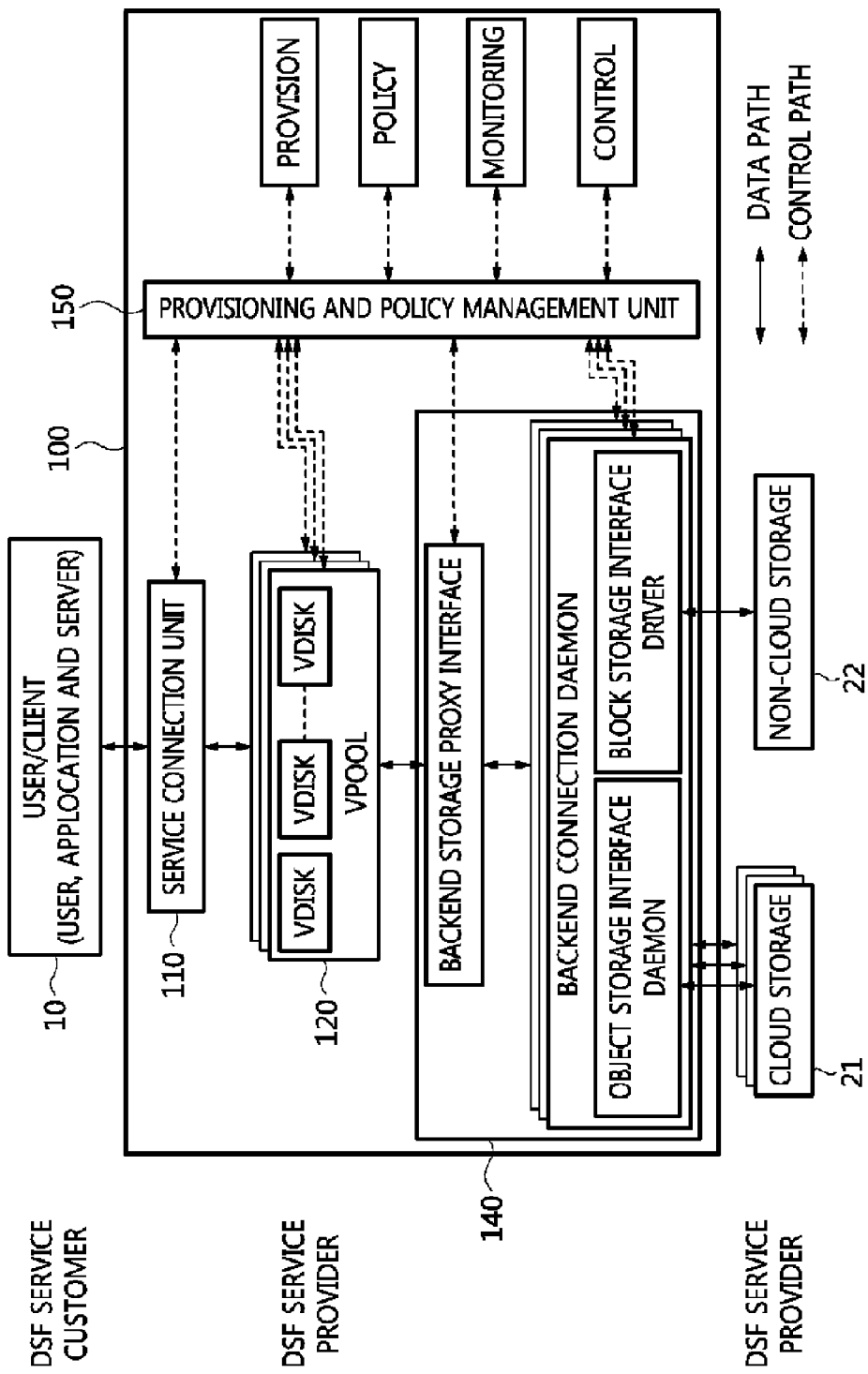
FIG. 11 is a block diagram that shows a multi-tenant-based integrated storage management apparatus using a backend connection daemon according to an embodiment of the present invention.

FIG. 11 is a block diagram that shows a multi-tenant-based integrated storage management apparatus using a backend connection daemon according to an embodiment of the present invention.

Referring to FIG. 11, the multi-tenant-based integrated storage management apparatus using a backend connection daemon according to an embodiment of the present invention includes multiple storage connection units 110, multiple data manipulation units 120, multiple data distribution and storage units 130, and multiple backend storage management units 140, which are provided for the respective storage services provided by service providers 31, 32 and 33, and a single provisioning and policy management unit 150.

The storage connection unit 110 may provide the storage service of the integrated storage 20 to a user by operating in connection with the integrated storage 20.

Here, the integrated storage 20 may include at least one cloud storage unit 21 and non-cloud storage 22.

The data manipulation unit 120 generates a virtual disk pool of the integrated storage 20, thereby providing a single storage view through at least one virtual disk.

The data distribution and storage unit 130 may provide a data distribution and encryption function such that, when the received data is written, the data is always accessed with the minimum overhead.

The backend storage management unit 140 may interface with the integrated storage 20 using a connection daemon in the form of software.

Here, the backend storage management unit 140 may include a necessary interface (an object or block storage interface) and a backend connection daemon configured to interface with various types of storage units, and may provide a proxy interface for enabling easy registration of the multiple storage units.

Here, the proxy interface in the backend storage management unit 140 may register a cloud service by detecting the storage area interface of the first daemon, which is connected with the cloud storage 21, and that of the second daemon, which is connected with the non-cloud storage 22.

The backend storage proxy may register a service in such a way that the backend connection daemon, in which an object storage daemon interface or a block storage interface driver is stored, automatically detects the storage area interface.

The backend connection daemon may be run through a virtual machine or a container, excluding a block device, in order to connect to the integrated storage 20, whereby the connection with object storage may be made.

Here, the backend storage management unit 140 may output information about the storage for which interfacing is performed as the storage in which a storage service can be registered.

Here, the backend storage management unit 140 may manage information for access by a user to a system and provide a secure path for access for registration of a storage service.

Here, the backend storage management unit 140 may generate a backend connection daemon whenever a single storage device is connected therewith, and may connect the backend connection daemon with a proxy server. The proxy server (not illustrated) may store and manage user data through a driver interface, which is connected with a virtual disk pool (Vpool) through the data manipulation unit 120.

Accordingly, the integrated storage management apparatus 100 may generate a single virtual disk (vdisk) when a registered service provider accesses the integrated storage management apparatus 100, and the generated virtual disk may be managed in the virtual disk pool. Here, through the respective virtual disk pools, a user may be provided with multiple storage services from the storage in which the storage services are registered.

In the backend storage management unit 140, the storage configuration may be different from the on-premise and public cloud storage services. The interface for the backend storage may be provided in the form of a separate software daemon. When multiple cloud storage devices are present, DSF local storage management may be configured, an interface with a proxy interface may be configured, and an interface for registering and using on-premise storage may be provided.

The provisioning and policy management unit 150 may manage the provision of storage services based on multi-tenant architecture by accepting registration of the storage services from multiple service providers.

Here, the provisioning and policy management unit 150 enables an administrator to register cloud storage 21 and non-cloud storage 22 for providing a storage service and to configure a new service in the integrated storage management apparatus 100 through an administration GUI.

Here, when a service provider signs up for the service and uploads and creates a file, the provisioning and policy management unit 150 may generate a cloud account, and the uploaded file may be stored in the cloud storage 21 or the non-cloud storage 22 at the discretion of the administrator.

Here, the provisioning and policy management unit 150 may also provide the function of displaying, writing, modifying and deleting the content of the cloud service registered in the cloud storage 21 and the non-cloud storage 22, which are integrated into the integrated storage 20, through the administration GUI.

With regard to the configuration of storage, the service of the cloud storage 21 may be provided along with the basic configuration, separately from that of the non-cloud storage 22.

Here, the provisioning and policy management unit 150 may configure the functions of logical components as servers, virtual systems, or containers having a connection network by taking the form of modules or functions having the respective functions.

Here, the provisioning and policy management unit 150 may register the storage service in any one storage unit included in the integrated storage 20 that matches service registration information input by a service provider.

Here, the provisioning and policy management unit 150 may provide the storage service by setting virtual storage in the storage in which the storage service is registered.

Here, the provisioning and policy management unit 150 may manage the storage service using a first path (data path), along which data is moved, and a second path (control path) for controlling data in order to prevent the I/O performance of the storage service from being degraded.

Here, the management function for managing the first and second paths may provide the function of displaying, creating, modifying and deleting the content of the on-premise and public cloud services integrated into the single storage unit.

In FIG. 11, each logical component may be configured as a single server or multiple servers, and may be configured as a network through a server, a virtual system, or a container.

The DSF service provider, corresponding to the integrated storage management apparatus 100 according to an embodiment of the present invention, may provide different interfaces for the data path and the control path in order to prevent the performance of the storage service from being degraded.

The DSF service provider may individually configure and control all of the logical components and the interfaces corresponding thereto for self-configuration.

"Self-configuration" indicates the automatic configuration of logical components, and the DSF service provider may manage the configuration of each component included in the server, the virtual system, or the container using a connection network.

The DSF service provider may include the integrated storage in the DSF service by managing the backend storage interface. In order to include the integrated storage, backend storage management may provide an interface (e.g., entity or block storage interface) and a proxy. The interface for configuring various types of storage interfaces may be provided. The backend storage proxy automatically detects the storage interface using the backend connection daemon, thereby registering a service.

The DSF service provider may support a secure cloud storage interface for a DSF service customer.

Figure 12:
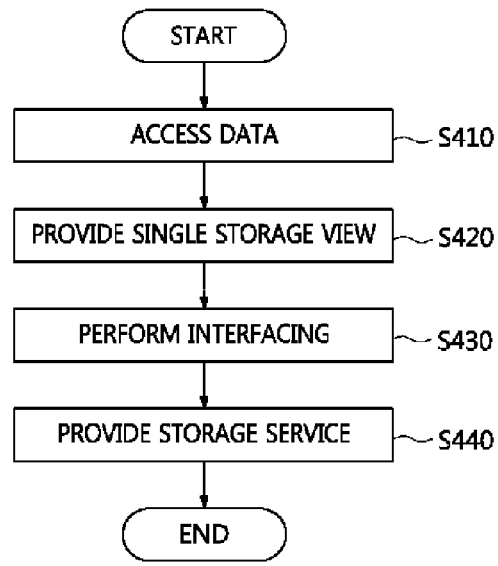
FIG. 12 is a flowchart that shows a multi-tenant-based integrated storage management method for providing a storage service according to an embodiment of the present invention.

FIG. 12 is a flowchart that shows a multi-tenant-based integrated storage management method for providing a storage service according to an embodiment of the present invention.

Referring to FIG. 12, in the multi-tenant-based integrated storage management method according to an embodiment of the present invention, first, data may be accessed at step S410.

That is, at step S410, data may be accessed in order to provide a user with the storage service of integrated storage 20 through a connection with the integrated storage 20.

Here, the integrated storage 20 may include at least one cloud storage unit 21 and non-cloud storage 22.

Also, in the multi-tenant-based integrated storage management method according to an embodiment of the present invention, a single storage view may be provided at step S420.

That is, at step S420, a virtual disk pool of the integrated storage 20 is generated, whereby a single storage view may be provided through at least one virtual disk.

Here, at step S420, a data distribution and encryption function may be provided such that, when the received data is written, the data is always accessed with the minimum overhead.

Also, in the multi-tenant-based integrated storage management method according to an embodiment of the present invention, interfacing may be performed at step S430.

That is, at step S430, interfacing with the integrated storage 20 may be performed using a connection daemon in the form of software.

Here, at step S430, a necessary interface (an object or block storage interface), a backend connection daemon configured to interface with various types of storage units, and a proxy interface for easily registering multiple storage units may be provided.

Here, at step S430, the proxy interface may register a cloud service by detecting the storage area interfaces of the first daemon, which is connected with the cloud storage 21, and of the second daemon, which is connected with the non-cloud storage 22.

The backend storage proxy may register a service in such a way that the backend connection daemon, in which an object storage daemon interface or a block storage interface driver is stored, automatically detects the storage area interface.

The backend connection daemon may be run through a virtual machine or a container, excluding a block device, in order to connect to the integrated storage 20, whereby the connection with object storage may be made.

Here, at step S430, information about the storage for which interfacing is performed may be output as the storage in which a storage service can be registered.

Here, at step S430, for registration of a storage service, information for access by a user to a system may be managed, or a secure path for access may be provided.

Here, at step S430, a single backend connection daemon may be generated whenever a single storage unit is connected, and the backend connection daemon may be connected with a proxy server. The proxy server (not illustrated) may store and manage user data through a driver interface connected with a virtual disk pool (Vpool) in the upper layer through the data manipulation unit 120.

Accordingly, the integrated storage management apparatus 100 may generate a single virtual disk (vdisk) when a registered service provider accesses the integrated storage management apparatus 100, and the generated virtual disk may be managed in the virtual disk pool. Here, through respective virtual disk pools, a user may be provided with multiple storage services from the storage in which the storage services are registered.

Also, in the multi-tenant-based integrated storage management method according to an embodiment of the present invention, a storage service may be provided at step S440.

That is, at step S440, the provision of a storage service may be managed based on multi-tenant architecture by accepting registration of storage services from multiple service providers.

Here, at step S440, an administrator may register cloud storage 21 and non-cloud storage 22 for providing a storage service, and may configure a new service in the integrated storage management apparatus 100 through an administration GUI.

Here, at step S440, when a service provider registers by signing up for the service and uploads and creates a file, a cloud account may be generated, and the uploaded file may be stored in the cloud storage 21 or the non-cloud storage 22 at the discretion of the administrator.

Here, at step S440, the function of displaying, writing, modifying and deleting the content of a cloud service registered in the cloud storage 21 and the non-cloud storage 22, which are integrated into the integrated storage 20, may be provided through the administration GUI.

With regard to the configuration of storage, the service of the cloud storage 21 may be provided along with the basic configuration, separately from that of the non-cloud storage 22.

Here, at step S440, the functions of logical components may take the form of modules or functions having the respective functions, whereby the functions of logical components may be individually configured as servers, virtual systems, or containers having a connection network.

Here, at step S440, the storage service may be registered in any one storage unit included in the integrated storage 20 that matches service registration information input from the service provider.

Here, at step S440, the storage service may be provided by setting virtual storage in the storage unit in which the storage service is registered.

Here, at step S440, the storage service may be managed using a first path (data path), along which data is moved, and a second path (control path) for controlling data in order to prevent the I/O performance of the storage service from being degraded.

Figure 13:
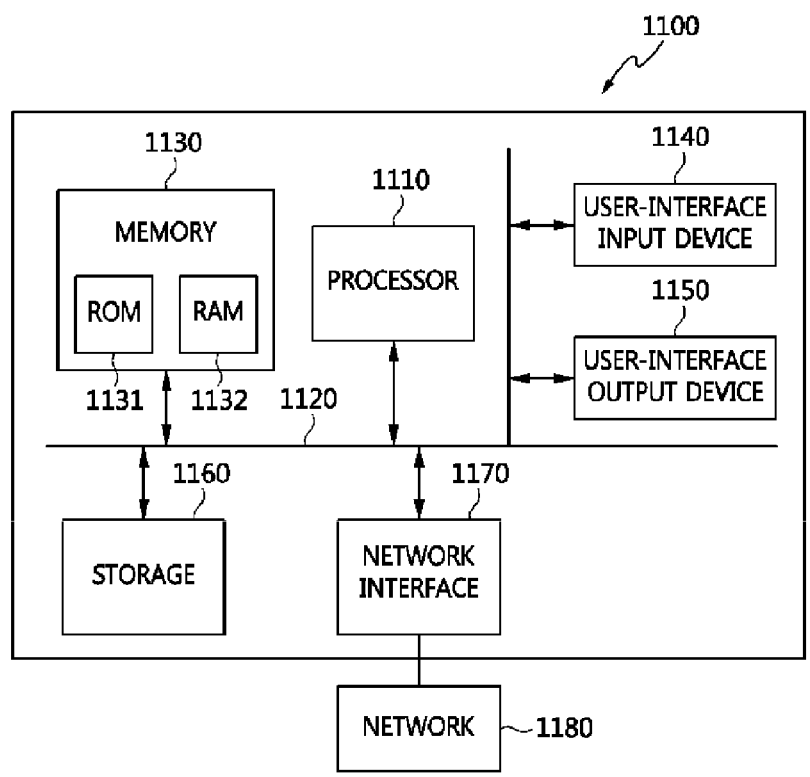
FIG. 13 is a view that shows a computer system according to an embodiment of the present invention.

FIG. 13 is a block diagram that shows a computer system according to an embodiment of the present invention.

Referring to FIG. 13, the user client device 10 and the integrated storage management apparatus 100 according to an embodiment of the present invention may be implemented in a computer system 1100 including a computer-readable recording medium. As shown in FIG. 13, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

Figure 14:
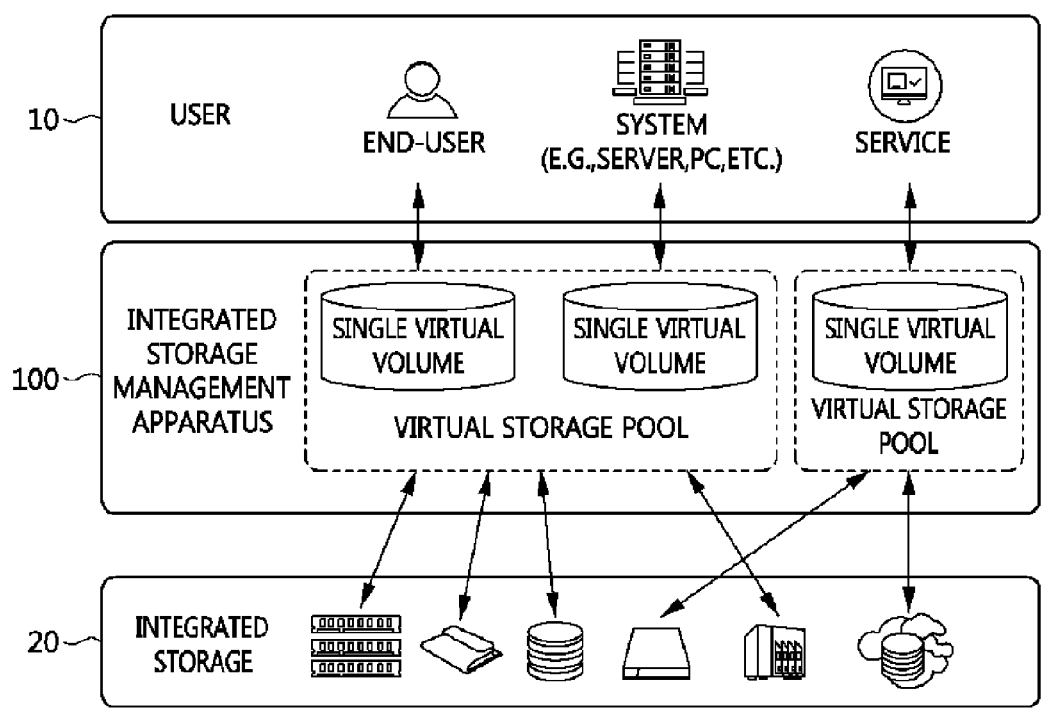
FIG. 14 is a view that shows an integrated storage system according to an embodiment of the present invention.

FIG. 14 is a view that shows an integrated storage system according to an embodiment of the present invention.

Referring to FIG. 14, the integrated storage system according to an embodiment of the present invention may include a user client device 10, an integrated storage management apparatus 100, and integrated storage 20.

First, Data Storage Federation (DSF) technology according to an embodiment of the present invention may be technology for providing a single virtual volume from multiple data sources of heterogeneous storage units using storage virtualization.

Data virtualization may be technology for abstracting a logical data resource from various data resources and managing the same regardless of a resource location or a data structure.

Here, the various data resources may include a file, a database, a system, storage, and the like.

Here, DSF may include various data resources, excluding a database.

The DSF local storage may be present in the back end of DSF, and may be a physical storage device in which data is finally stored.

The physical storage device may include on-premise storage (e.g., memory, an SSD, an HDD, SAS, iSCSI storage, NAS, and the like) and public cloud storage having a complicated management device such as blocks, entities, and files.

A single virtual volume may be an entity for providing a customer with a virtual block device, a virtual disk, or a virtual file generated using storage virtualization.

The customer may include an end user, a server, an operating system, an application, and other storage devices of a cloud service provider, which use the single user volume.

Storage virtualization may be technology for integrating various types of storage units in a virtual storage pool and dividing the virtual storage pool into a single virtual volume without limitation as to physical operations.

Here, storage virtualization may not impede data access, and may not degrade the performance of the storage devices.

A virtual storage pool (VPOOL) may be a logical object that aggregates DSF local storage units into a single virtual volume.

The abbreviations that are used are as follows.
API Application Program Interface
CRUD Create Read Update Delete
CSC Cloud Service Customer
CSP Cloud Service Provider
CSU Cloud Service User
CUA-F Customer Access Function
DFM-F Data Fragment Function
DME-F Data Manipulation Enhancement Function
DM-FS DSF data Manipulation Functions
DMP Data Manipulation Provider
DOC-F Data Operation with write buffer and read Cache Function
DSC-F DSF local Storage Connection Function
DSF Data Storage Federation
DS-FS DSF local Storage Functions
ENC-F Encryption/decryption, compression/decompression Function
FTP File Transfer Protocol
I/O Input/Output
iSCSI internet Small Computer System Interface
NAS Network Attached Storage
NFS Network File System
NVMe Non Volatile Memory express
PP-FS Provision and Policy management Functions
POL-F Policy management of data storage and data manipulation Function
PRO-F Provision of single virtual volume and virtual storage pool Function
RAM Random Access Memory
SAN Storage Attached Network
SC-FS Single virtual volume Connection Functions
SCSI Small Computer System Interface
SFP Storage Federation Provider
SFTP Secure File Transfer Protocol
SSH Secure Shell
SSD Solid State Drive
STS-F Storage Structuring Function
SVI-F Single Virtual volume Interface Function
VSP-F Virtual Storage Pool management Function The data storage policy according to an embodiment of the present invention may include backups, replication, snapshots, automatic scaling, data migration, sales recovery, data caching, thin provisioning, automatic tiering, a storage life (a block, an entity, and a file), and the like.

Here, the data storage policy is set by default using any of the above-described components, and may be reconfigured in response to a request from a customer (user). Also, the data storage policy may be changed based on the policy of the DSF local storage.

The reconfigured policy may be a policy reconfigured using the above-described components when the DSF local storage does not support its own policy.

A data manipulation policy may select a non-sharing mode or a sharing mode including read-only, write, a replication option, a fragmentation option, and the like.

Also, the integrated storage device according to an embodiment of the present invention may process customer metadata, generated by a customer in order to configure a customer environment, data manipulation metadata required for data manipulation, and storage management metadata used for the DSF local storage.

Here, the integrated storage device according to an embodiment of the present invention is configured such that CSP:DSM may provide CSC:CSU with an integrated user interface for using a single virtual volume.

The integrated user interface may include integration of interaction with its data storage, data sharing, access mechanisms of various storage types, which enable CSC:CSU to access a single virtual volume, and the like.

The storage types may include object-based storage, file-based storage, block-based storage, and the like.

The access mechanism may represent different types of protocols for connection with a single virtual volume, in which case the protocol is dependent on the storage type. The protocols may include iSCSI for block device storage, SMB, NFS, SFTP, and FTP for file-based storage, Restful API for object-based storage, and the like.

CSP:FDSP may provide an interface for enabling CSC:CSU to establish a policy.

In order to manage a single virtual volume, a virtual storage pool, and DSF local storage, CSP:DSM may provide an integrated management interface to CSC:CSU.

Also, the integrated storage device according to an embodiment of the present invention may correspond to Data Storage Federation (DSF).

DSF may provide CSC:CSU with an integrated user interface for using the single virtual volume.

The integrated user interface may integrate interaction with its data storage, such as data sharing therewith, access mechanisms of various storage types for enabling CSC:CSU to access a single virtual volume, and the like.

DSF may provide an interface for enabling CSC:CSU to establish a policy.

DSF is configured such that a DSF service provider may support parallel access in order to improve the performance of a DSF service.

Here, the DSF service provider may provide an interface for registering storage provided by a data storage provider.

Performance improvement may be related to data caching, storing data, and the like.

DSF is configured such that CSP:DSM may provide CSC:CSU with an integrated management interface for managing a single virtual volume (the virtual storage pool and the DSF local storage).

The functions for DSF may include a storage connection interface, data integration management, and data storage management.

The functions for the storage connection interface may be performed in the storage connection unit 110 according to an embodiment of the present invention.

The storage connection interface is configured such that the DSF service provider may support an access mechanism depending on a storage type.

The storage connection interface is configured such that CSP:FDSP may collect and search for service information including a storage type and an access mechanism when CSC:CSU requires a single virtual volume.

For example, the service information may be the service catalog of CSP:FDSP.

The storage connection interface is configured such that CSP:FDSP may guarantee high-speed access to a global namespace for accessing actual data in the DSF local storage.

The global namespace may be technology for abstracting and integrating heterogeneous file systems in various storage devices and cloud storage. The global namespace may reduce the complexity of localized file management, facilitate storage extension, and reduce the number of mount points and sharing points by transparently migrating data. The global namespace is implemented using any of various methods, but the configuration of CSC:CSU may maintain the same access.

The storage connection interface may provide the global namespace for enabling CSC:CSU to integrate various files systems in DSF local storage and manage the same.

The storage connection interface is configured such that CSP:DSM may separately provide a management interface and a data interface in order to prevent the performance of the DSF service from being degraded.

The storage connection interface is configured such that CSP:DSM may individually configure and control all logical components and interfaces corresponding thereto for self-configuration.

Here, self-configuration indicates the automatic configuration of logical components, and the DSF service provider may manage the configuration of each of the components constructed in a server, a virtual system, or a container through a connection network.

The storage connection interface is configured such that CSP:DSM may manage a DSF local storage connection in order to include the integrated storage in the DSF service.

DSF local storage management may provide an interface (e.g., an object or block storage interface), through which various types of storage interfaces may be configured, and a proxy interface in order to include the integrated storage. The DSF local storage proxy may register a service by automatically detecting a storage interface using a backend connection daemon.

The storage connection interface is configured such that CSP:FDSP may use a secure storage interface for CSC:CSU and the DSF local storage.

The storage connection interface is configured such that CSP:DSM registration information for CSC:CSU may be used in order to use a single virtual volume.

The registration information may include the name of a data storage service, data storage specifications (the size, caching, the number of tiers, encryption, on-premise storage support, and the like), a service protocol, and a cloud storage type.

The storage connection interface is configured such that CSP:DSM may configure a data storage service and perform provisioning in order to invoke a single virtual volume in the registration information.

Also, the function for data integration management may be performed in the data manipulation unit 120 according to an embodiment of the present invention.

Data integration management is configured such that the DSF service provider may support a file itself and the content thereof as data.

The content type of a file may be configured with structured, semi-structured, and unstructured data.

Data integration management is configured such that CSP:FDSP may support aggregation of data distributed across the DSF local storage units of multiple DSF local storage providers using a corresponding API.

Data integration management is configured such that CSP:DSM may manage the data of CSC:CSU with a focus on the resilience and cost efficiency of the storage space.

For example, data movement for the resilience and cost efficiency of the data storage space may be automatically performed without user intervention or in the state in which a user is not aware of the data movement.

Data integration management is configured such that CSP:FDSP may verify validity in order to integrate the data of CSC:CSU.

Also, the function for data storage management may be performed in the data distribution and storage unit 130 and the backend storage management unit 140.

Data storage management is configured such that CSP:FDSP may provide simultaneous access to the multiple data storage providers in order to aggregate distributed data.

Data storage management is configured such that CSP:FDSP may support the delegation of permissions to access the DSF local storage to CSC:CSU.

Data storage management may provide a virtual storage pool that is visible through the view of a single system through integration with the DSF local storage.

Data storage management is configured such that CSP:FDSP may provide read/write caches in order to compensate for the fact that the access speed is slower than access speed of the on-premise storage.

The read/write caches may improve the performance of storage, and a device for storing data may use various devices for fast cache operations.

For example, the various devices for fast cache operations may include main memory, a RAM-based disk, an SSD, and the like.

For example, for high-speed access, the hierarchical structure of a cache may be extended to main memory. Also, due to the limited capacity of main memory, main memory may take an approach used in an SSD. When the RAM-based cache area is exhausted, the RAM-based cache area may automatically switch to the SSD area cache. When a DSF service customer performs a write operation, the write operation may be performed in the memory area for a fast response to the write operation.

Data storage management is configured such that CSP:FDSP may provide the backup of a global namespace for high availability.

The backup of the global namespace is synchronized with actual data, and the global namespace that is backed up may perform a high-availability function through clustering of multiple nodes (virtual machines or physical sensors).

Data storage management is configured such that CSP:FDSP may support addition of a single virtual volume depending on the requirement of a DSF service customer, such as block-based storage, file-based storage, or other cloud storage.

Also, the function for provision and policy management may be performed in the provisioning and policy management unit 150.

Provision and policy management may provide a configuration for setting a data storage policy for CSC:CSU.

Provision and policy management may support the DSF service provider to manipulate a data policy for a DSF service customer.

For example, the data policy may include a non-sharing mode and a sharing mode, including read-only, write, replication, and the like.

Provision and policy management may include a function for a security policy (e.g., data encryption) for supporting CSP:FDSP in order to guarantee the confidentiality of the data of CSC:CSU when the data is transmitted.

Provision and policy management enable CSP:FDSP to prevent data loss caused by errors in the storage structure based on distributed storage and to provide data recovery in the event of a system failure.

The integrated storage management apparatus 100 may handle various types of data, such as structured data, semi-structured data, and unstructured data, in order to improve service quality and to create a new service.

Here, the integrated storage management apparatus 100 may efficiently manage and integrate heterogeneous storage units in order to use various types of data in the integrated storage 20, and may easily use the data.

Here, the integrated storage management apparatus 100 may provide the user client device 10 with a virtual storage pool of a single virtual volume.

Here, the integrated storage management apparatus 100 may process various requests, such as requests to create, store, read, and update data in the integrated storage 20 and a request to delete data therefrom.

Data virtualization is technology for managing multiple data resources without interruption regardless of the location of the resources or data structures.

The multiple data resources may include files, databases, systems, storage, and the like.

The integrated storage 20 may be located in the back end of the integrated storage management apparatus 100, and may be physical storage devices in which data is finally stored.

The physical storage devices may include on-premise storage 22 (e.g., memory, an SSD, an HDD, SAS, iSCSI storage, NAS, and the like) and public cloud storage 21, with management units such as a block, an object, and a file.

The single virtual volume is a virtual file created using a virtual block device, a virtual disk, or a virtual file, and may be an object provided to the user client device 10.

The user client device 10 may include an end user, a server, an operating system, an application, and other storage devices of a cloud service provider using the single virtual volume.

The integrated storage management apparatus 100 may integrate the different types of storage units into a virtual storage pool using storage virtualization technology, and may divide the virtual storage pool into a single virtual volume regardless of the physical storage.

Such a single virtual volume enables data access without obstacles and has little negative effect on the performance of the storage device.

The virtual storage pool may be a logical object that provides the storage units of the integrated storage 20 as a single virtual volume through a single virtual storage view.

As illustrated in FIG. 14, a virtual storage pool may be formed with the integrated storage 20 (cloud storage 21 and on-premise storage 22) that is arranged after being connected to an API and an I/O interface. The integrated storage 20 may support a block type, a file type, and an object type.

The integrated storage management apparatus 100 may create a single virtual volume storage unit and provide the same to the user client device 10.

Here, the integrated storage management apparatus 100 may create a single virtual volume storage unit through the federation of the integrated storage 20, and may provide a single access point to the user client device 10.

Here, the integrated storage management apparatus 100 may support the single virtual volume storage unit using policy-based provision and management. The policy-based provision and management may be helpful for an administrator to improve operation management, and may be helpful for a user to easily use the single virtual volume storage unit by simplifying the same.

Each user may use the single virtual volume storage unit using the user client device 10 when the user creates, stores, reads, updates, or deletes user data (e.g., images for a gallery, audio data for a music player, documents for collaboration, application data for a service, and the like) on the single virtual volume storage unit of the user.

When the user client device 10 is connected with the single virtual volume storage unit of the integrated storage management apparatus 100, unified request commands may be executed as if the integrated storage 20 had a different connection.

The user data supported by the integrated storage management apparatus 100 may or may not be distributed depending on the policy-based provision and management.

The integrated storage management apparatus 100 may abstract data information, such as the location of storage, a data history, the type of the content of a file, and the like, from user data in order to handle the user data.

Here, the integrated storage management apparatus 100 may realize data virtualization on the virtual storage pool using data abstraction.

Here, the integrated storage management apparatus 100 may reduce the processes of retrieving data and handling data I/O by reducing data replication in the virtual storage pool and by providing a data-sharing environment in which data is shared without replication or movement of original data. The interaction for data manipulation may be based on the data operation policy of a user. For example, read-only access, overwriting, replication, or the like in the sharing mode may be based on the data operation policy.

Here, the single virtual volume may be constructed by a set of connections with different storage units of the integrated storage.

Figure 15:
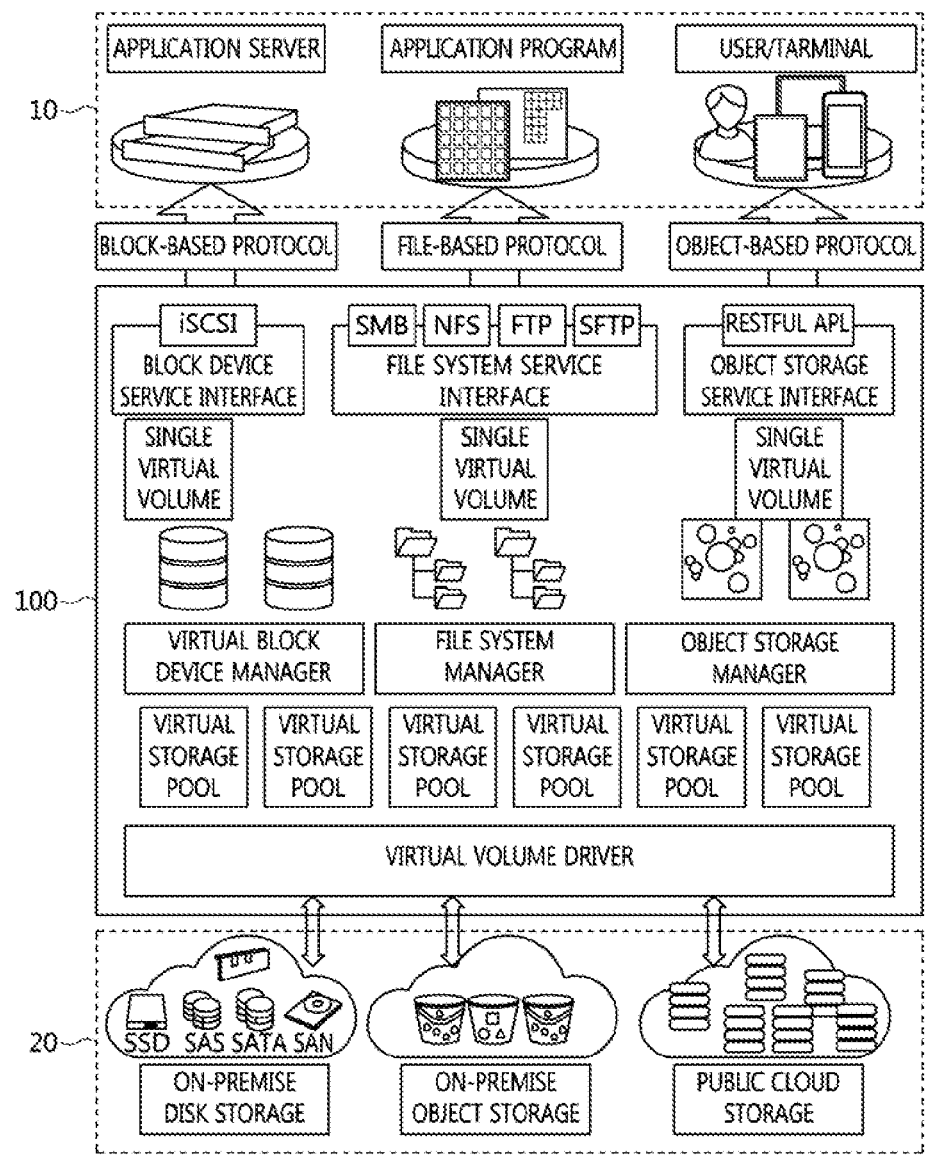
FIG. 15 is a view that shows multiple storage types and access mechanisms for data access in an integrated storage system according to an embodiment of the present invention.

FIG. 15 is a view that shows multiple storage types and access mechanisms for data access in an integrated storage system according to an embodiment of the present invention.

Referring to FIG. 15, a user client device 10 may request a variety of service interfaces and storage types from the integrated storage management apparatus 100.

Here, the integrated storage management apparatus 100 may provide the user client device 10 with a service interface using a corresponding access mechanism.

Here, the user client device 10 may use its storage type.

Here, the user client device 10 may be a general user (who possesses individual storage), an application, an application server, or another cloud system.

Here, the integrated storage management apparatus 100 may provide various storage types.

The storage type may be object-based storage, file-based storage, block-based storage, or the like.

Here, the integrated storage management apparatus 100 may support an access mechanism based on the storage type.

The access mechanism may include different types of protocols depending on the storage type.

Examples of the protocols may include iSCSI for block device storage, SMB, NFS, SFTP, and FTP for file-based storage, and a protocol using the RESTful API for object-based storage.

An example of service information may be a service catalog for the integrated storage 20.

Figure 16:
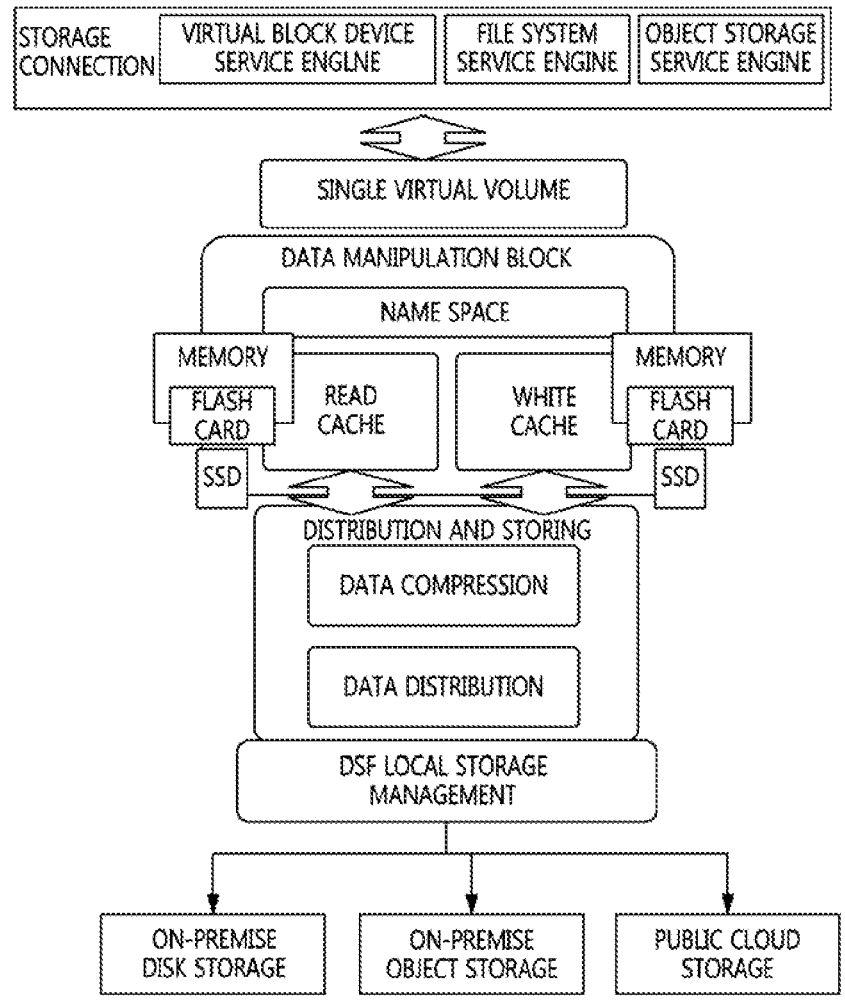
FIG. 16 is a view that shows data read/write caches for improving performance and a parallel distributed file according to an embodiment of the present invention.

FIG. 16 is a view that shows data read/write caches for performance improvement and a parallel distributed file according to an embodiment of the present invention.

Referring to FIG. 16, CSP:FDSP may provide a cache function for data stored in public cloud storage. Because data is transmitted over the Internet, access to the data stored in the public cloud storage may be slower than access to data stored in on-premise storage. Also, because data is automatically distributed to the public cloud storage in the state in which CSC:CSU is not aware of the distribution, a high-speed access function may be performed for the data stored in the public cloud storage. CSP:FDSP caches the data stored in the public cloud storage to the storage device inside a cloud-integrated storage operating platform, thereby providing the public cloud storage with an access speed close to the speed at which on-premise storage is accessed.

CSC:CSU may request a single virtual volume from CSP:FDSP, and may have its own data storage.

CSP:FDSP may provide a storage system, an appliance, or a device for integration with other storage.

A DSF service provider may provide read/write caches in order to compensate for the fact that the access speed is slower than the speed at which on-premise storage is accessed.

The read/write caches may be software for improving the performance of storage, and a data storage device for a cache function may be implemented using any of various devices for fast cache operations.

For example, the various devices for fast cache operations may be main memory, a RAM-based disk, and an SSD.

For high-speed access, the hierarchical structure of a cache may be extended to main memory. Also, due to the limited capacity of main memory, main memory may use a method that is used for an SSD. When the RAM-based cache area is exhausted, the RAM-based cache area may automatically switch to the SSD area cache. When a DSF service customer performs a write operation, the write operation may be performed in the memory area for a fast response to the write operation.

The DSF service provider may provide high-speed access to a global namespace using various devices in order to access actual data.

The global namespace may abstract and integrate heterogeneous file systems in various storage devices and cloud storage.

The global namespace greatly reduces the complexity of localized file management, facilitates the extension of storage, and transparently migrates data, thereby reducing the number of mount points and sharing points. The global namespace may be implemented using any of various methods, but a client may maintain the same access.

The DSF service provider may provide the backup of the global namespace for high availability. The global namespace is backed up in real time, and the global namespace that is backed up may provide a high-availability function through clustering of multiple nodes (virtual machines or physical servers).

The DSF service provider may support a security policy (e.g., data encryption) for data transmission in order to guarantee confidentiality of the data of a user.

The DSF service provider may support the aggregation of data distributed across the heterogeneous data storage units of multiple data storage providers.

The DSF service provider may provide simultaneous access to multiple data storage providers in order to aggregate the distributed data.

The DSF service provider may support the delegation of permissions to access heterogeneous storage to a DSF service customer.

Figure 17:
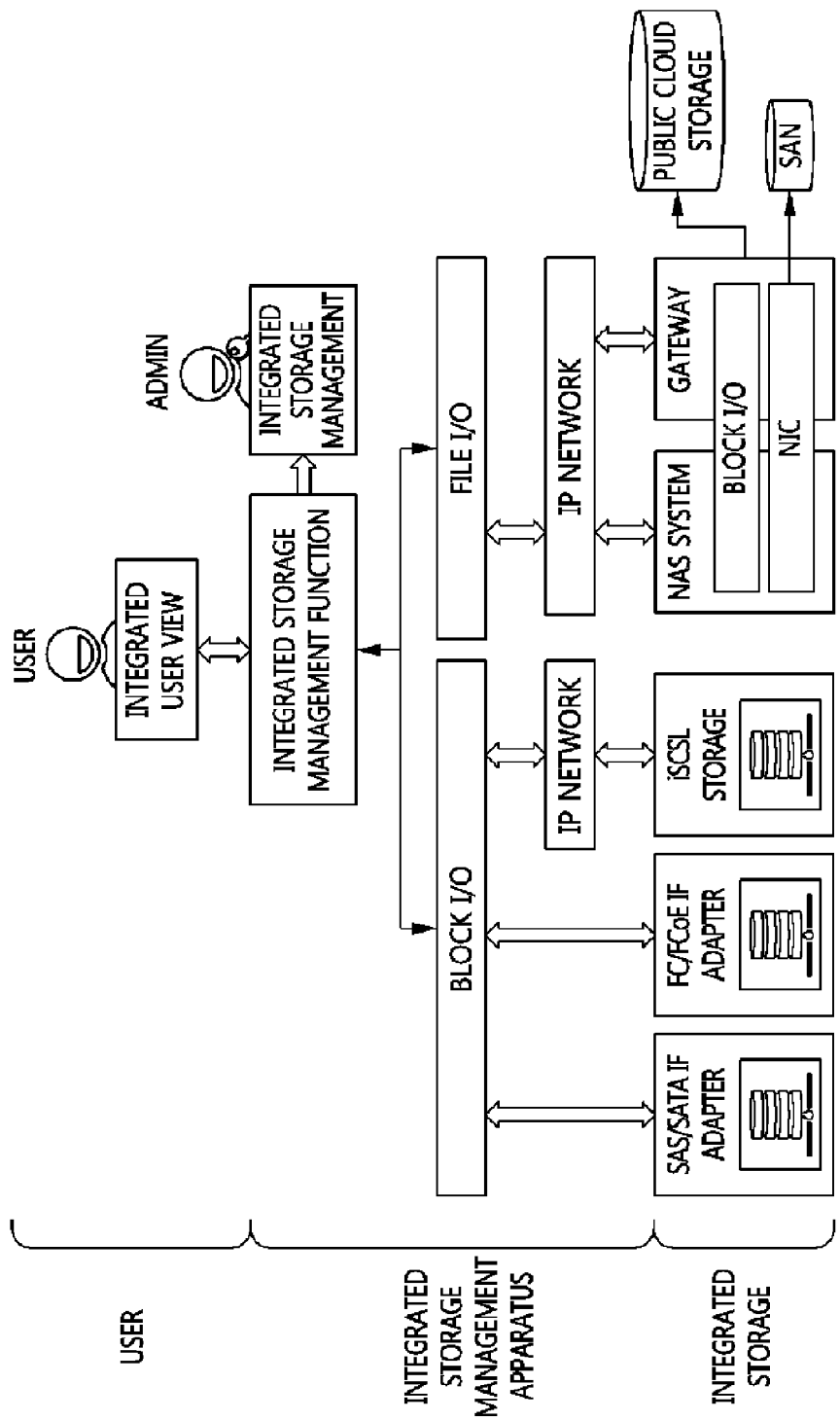
FIG. 17 is a view that shows a use case of an integrated storage management system according to an embodiment of the present invention.

FIG. 17 is a view that shows a use case of an integrated storage management system according to an embodiment of the present invention.

Referring to FIG. 17, a use case for an integrated storage management apparatus 100, which is a single storage system connected with integrated storage 20 including various storage types, is illustrated. As shown in FIG. 17, regardless of the type of storage system, storage used by a user client device 10 may be regarded as integrated storage through an integrated user view, and the user client device 10 does not have to give consideration to the storage used thereby. Accordingly, the integrated storage management function by the integrated storage management apparatus 100 may be configured such that an integrated storage system or an appliance makes various storage systems appear to the user client device 10 as a single system. Further, the integrated storage management apparatus 100 may provide an integrated management interface.

Here, the user client device 10 may request data storage from the integrated storage management apparatus 100, and may possess the requested data storage.

Here, the integrated storage management apparatus 100 may provide a storage system, an appliance, or a device for integration with other storage units.

Here, the integrated storage management apparatus 100 may support various types of data storage units, such as block-based storage, file-based storage, or other cloud storage, depending on the requirements of the user client device 10.

Here, the integrated storage management apparatus 100 may provide the user client device 10 with an integrated user interface for data storage access for various types of service mechanisms.

Here, the integrated storage management apparatus 100 may prevent data loss caused by errors in a storage structure based on distributed storage, and may provide a data recovery function in the event of a system error.

Here, the integrated storage management apparatus 100 may provide a global namespace.

Here, the integrated storage management apparatus 100 may provide a unified management interface to the user client device 10 in order to manage the data storage.

Here, the integrated storage management apparatus 100 may integrate the data storage by providing a user interface for a policy and other options.

Here, the integrated storage management apparatus 100 may integrate the data of the user client device 10 and verify the same.

For example, CSC:CSU may correspond to integrated storage, and may include various types of storage units. Accordingly, the integrated storage system or appliance may regard the multiple storage systems of the storage as a single system. As a management function with regard to this, an integrated management interface may be provided.

CSC:CSU may request data storage from a DSF service provider, and may have its own data storage.

CSP:FDSP may enable a storage system, an appliance, or storage to integrate other storage.

The DSF service provider may provide data storage displayed in a single system view through integration with on-premise storage, cloud storage, and other storage.

The DSF service provider may correspond to the integrated storage management apparatus 100 according to an embodiment of the present invention.

The DSF service provider may manage data of a DSF service customer with a focus on the resilience and cost efficiency of the storage space.

For example, data movement for the resilience and cost efficiency of the data storage space may be automatically performed without user intervention or in the state in which a user is not aware of the data movement. The user may use the data storage service with the same performance in the state in which the user is not aware of whether the data is stored in the on-premise storage or the cloud storage.

The DSF service provider may support various types of data storage units, such as block-based storage, file-based storage, or other cloud storage, depending on the requirement of a DSF service customer.

The DSF service provider may provide an integrated user interface in order to enable a DSF service customer to access data storage for various types of service mechanisms.

The DSF service provider may prevent data loss caused by errors in a storage structure based on distributed storage, and may provide data recovery in the event of a system error.

The DSF service provider may provide a global namespace for integrating and managing multiple file systems.

The DSF service provider may provide a DSF service customer with an integrated management interface for managing data storage.

The DSF service provider may provide a user interface for a policy and other options for data storage federation.

The DSF service provider may verify validity in order to federate the data of a DSF service customer.

Figure 18:
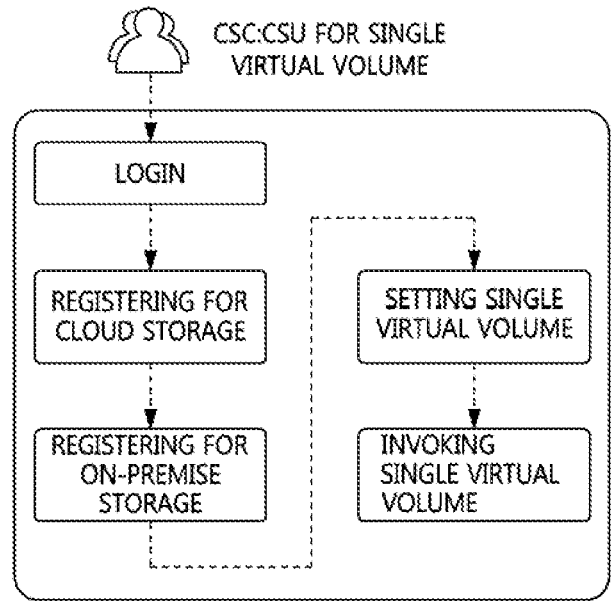
FIG. 18 is a flowchart that shows the process of registering data storage for an integrated storage service according to an embodiment of the present invention.

FIG. 18 is a flowchart that shows the process of registering data storage for an integrated storage service according to an embodiment of the present invention.

Referring to FIG. 18, CSC:CSU may request CSP:FDSP to register for cloud storage after log-in.

For data storage registration, CSC:CSU may log on through already registered authentication information, and may register for cloud storage and on-premise storage to be used.

The registration process may be provided by CSP:DSM through a GUI.

CSC:CSU may register a service name, storage specifications, a data storage service protocol, a cloud storage name, and a cloud storage type through the GUI, set virtual data storage, and generate virtual data storage.

CSC:CSU for virtual data storage may be a user registered in CSP:DSM.

CSP:DSM may have respective cloud storage service interfaces.

A DSF service provider may provide registration information in order to enable a DSF service customer to use the virtual data storage.

The registration information may include a data storage service name, data storage specifications (the size, caching, the number of tiers, encryption, whether on-premise storage is supported, and the like), a service protocol, and a cloud storage type.

The DSF service provider may invoke the virtual data storage by configuring and provisioning the data storage service from the registration information.

Figure 19:
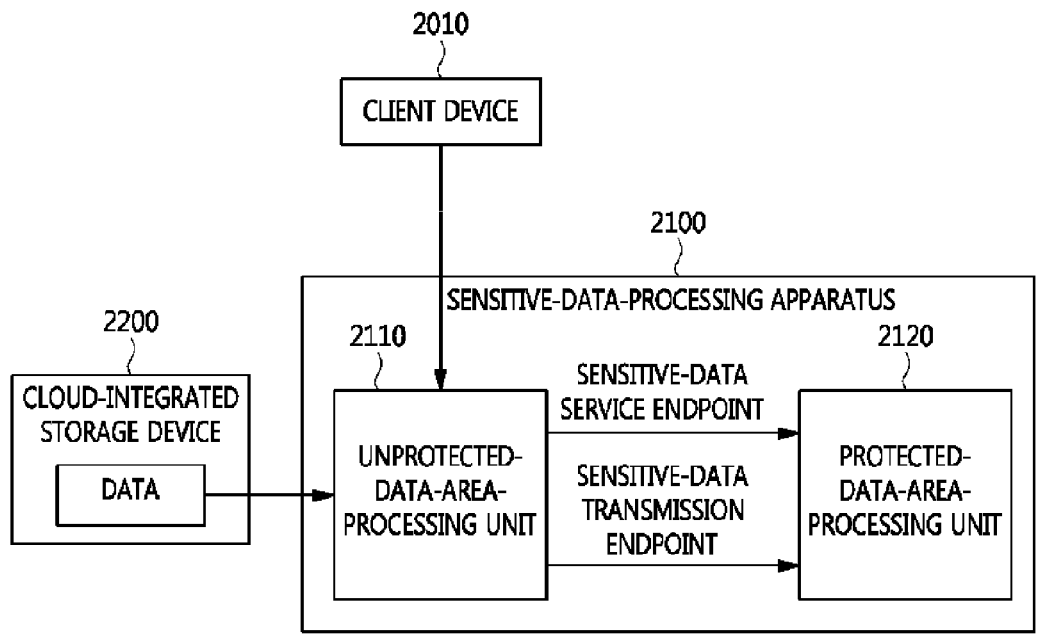
FIG. 19 is a block diagram that shows an apparatus for processing sensitive data according to an embodiment of the present invention.

FIG. 19 is a block diagram that shows an apparatus for processing sensitive data according to an embodiment of the present invention.

Referring to FIG. 19, the apparatus 2100 for processing sensitive data according to an embodiment of the present invention may include an unprotected-data-area-processing unit 2110 and a protected-data-area-processing unit 2120, and may read sensitive data from a cloud-integrated storage device 2200 and process the same in response to a request from a client device 2010.

The cloud-integrated storage device 2200 may store encrypted sensitive data therein.

The unprotected-data-area-processing unit 2110 may read the encrypted sensitive data from the cloud-integrated storage device 2200, and may transmit the encrypted sensitive data to the protected-data-area-processing unit 2120 using a sensitive-data storage endpoint.

The protected-data-area-processing unit 2120 may decrypt the received encrypted sensitive data and wait for a data service command request from the unprotected-data-area-processing unit 2110.

Here, after it receives a data service command from the client device 10 connected over a network, the unprotected-data-area-processing unit 2110 may forward the data service command to the protected-data-area-processing unit 2120 using a sensitive-data service endpoint.

Here, the protected-data-area-processing unit 2120 may perform data processing based on the decrypted sensitive data according to the received data service command and transmit the result of processing the sensitive data to the unprotected-data-area-processing unit 2110.

Here, the unprotected-data-area-processing unit 2110 may forward the result of processing the sensitive data to the client device 10.

Figure 20:
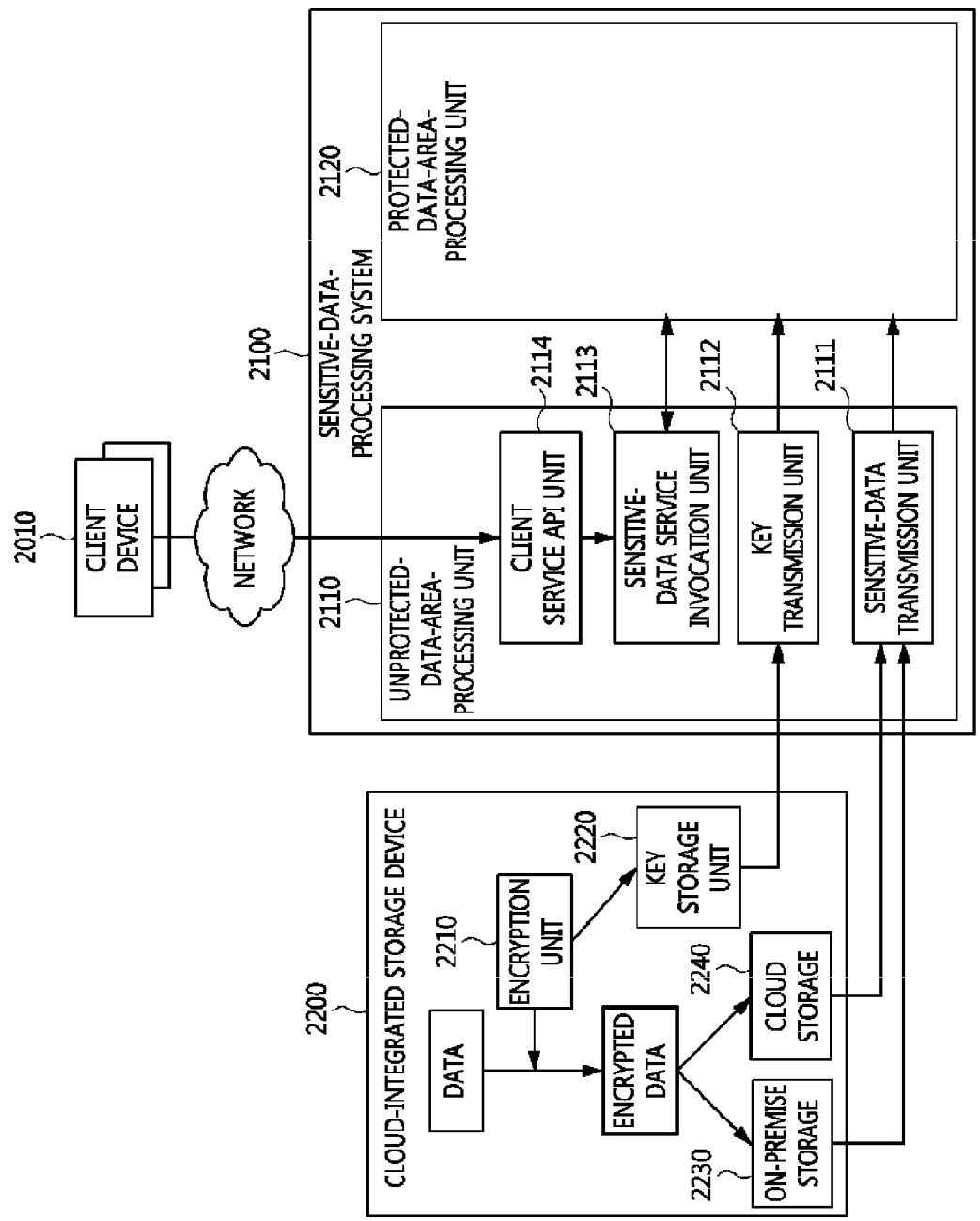
FIG. 20 is a block diagram that specifically shows an example of the cloud-integrated storage device and the unprotected-data-area-processing unit illustrated in FIG. 19.

FIG. 20 is a block diagram that specifically shows an example of the cloud-integrated storage device and the unprotected-data-area-processing unit illustrated in FIG. 19.

Figure 21:
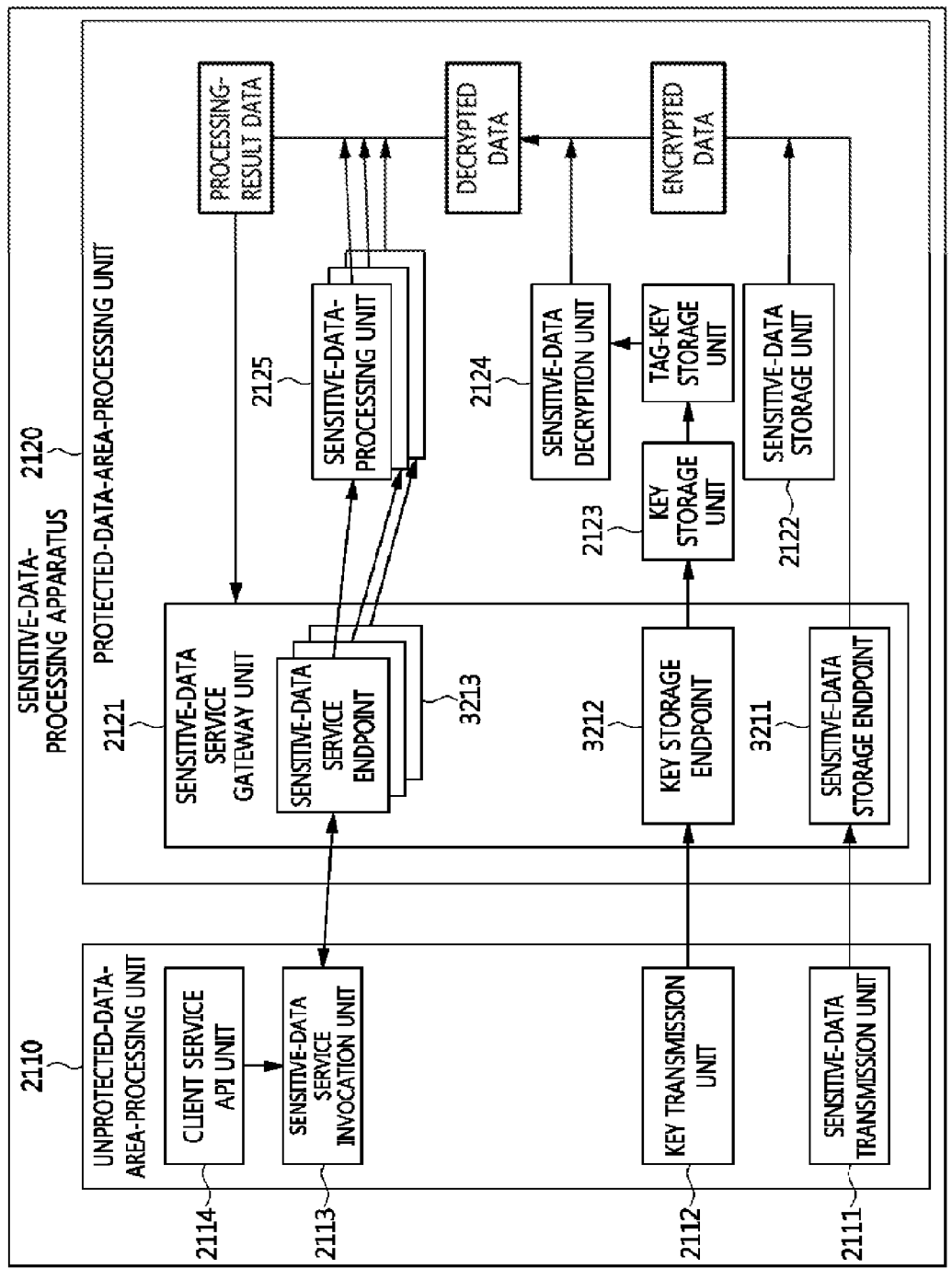
FIG. 21 is a block diagram that specifically shows an example of the unprotected-data-area-processing unit and the protected-data-area-processing unit illustrated in FIG. 20.

FIG. 21 is a block diagram that specifically shows an example of the unprotected-data-area-processing unit and the protected-data-area-processing unit illustrated in FIG. 19.

Referring to FIG. 20, the cloud-integrated storage device 2200 according to an embodiment of the present invention may include an encryption unit 2210, a key storage unit 2220, on-premise storage 2230, and cloud storage 2240.

The encryption unit 2210 may encrypt sensitive data and store the key used for the encryption in the key storage unit 2220.

The key used for the encryption may be encrypted with a master key in order to prevent leakage thereof, and may then be stored in the key storage unit.

Here, the encryption unit 2210 may store the encrypted sensitive data in the on-premise storage 2230 and the cloud storage 2240.

Also, the unprotected-data-area-processing unit 2110 of the sensitive-data-processing apparatus 2100 according to an embodiment of the present invention may include a sensitive-data transmission unit 2111, a key transmission unit 2112, a sensitive-data service invocation unit 2113, and a client service API unit 2114.

Also, the protected-data-area-processing unit 2120 of the sensitive-data-processing apparatus 2100 according to an embodiment of the present invention may include a sensitive-data service gateway unit 2121, a sensitive-data storage unit 2122, a key storage unit 2123, a sensitive-data decryption unit 2124, and a sensitive-data-processing unit 2125.

Here, the sensitive-data service gateway unit 2121 may include a sensitive-data storage endpoint 3211, a key storage endpoint 3212, and a sensitive-data service endpoint 3213.

The sensitive-data service gateway unit 2121 may provide a data-processing service for sensitive data.

Here, the sensitive-data service gateway unit 2121 may provide the result of processing sensitive data in the protected data area to the unprotected data area.

The sensitive-data storage endpoint 3211 may receive the encrypted sensitive data transmitted from the unprotected data area.

The key storage endpoint 3212 may receive a decryption key for decrypting the encrypted sensitive data from the unprotected data area.

Here, the sensitive-data service gateway unit 2121 may further include an endpoint that is invoked with the start of transmission of sensitive data and an endpoint that is invoked with the end of transmission of the sensitive data from the unprotected data area.

The sensitive-data transmission unit 2111 may read encrypted sensitive data from the cloud-integrated storage device 2200 and transmit the same using the sensitive-data storage endpoint 3211 of the protected-data-area-processing unit 2120.

The sensitive-data storage unit 2122 may store the encrypted data, received by the sensitive-data storage endpoint 3211, in the memory inside the protected data area.

The key transmission unit 2112 may receive a decryption key from the key storage unit 2220 of the cloud-integrated storage device and store the same in the tag-key storage unit 2123*a* of the key storage unit 2123 through the key storage endpoint 3212 of the protected-data-area-processing unit 2120. The tag-key storage unit 2123*a* may store a tag for the encrypted sensitive data and a decryption key corresponding thereto.

The sensitive-data decryption unit 2124 may extract a decryption key from the tag-key storage unit 2123*a* and decrypt the encrypted sensitive data using the decryption key.

Here, the client device 2010 may request a sensitive-data service by invoking the client service API unit 2114 of the sensitive-data-processing apparatus 2100 through a network in order to receive the data service.

The sensitive-data service invocation unit 2113 may transmit a data service command to the protected data area using the sensitive-data service endpoint 3213.

The sensitive-data service gateway unit 2121 invokes the sensitive-data-processing unit 2125 in response to invocation from the sensitive-data-service invocation unit 2113, thereby running a data-processing service.

The sensitive-data-processing unit 2125 may process the decrypted sensitive data in response to the data service request and store the generated sensitive-data-processing result as processing-result data. The decrypted sensitive data is securely protected inside the protected data area, whereby the decrypted sensitive data may be fundamentally prevented from being leaked outside. The processing-result data is transmitted to the unprotected data area through the sensitive-data service gateway unit 2121, and may then be transmitted to the client device 2010.

The unprotected data area of the unprotected-data-area-processing unit 2110 is an area in which there is a possibility of data leakage. Therefore, sensitive data inside the unprotected data area may be in an encrypted state in order to prevent the leakage thereof.

Here, sensitive data is not processed in the unprotected data area, and the sensitive data and a key for decrypting the same may be transmitted to the protected data area.

Also, the unprotected-data-area-processing unit 2110 may receive a sensitive-data service command from the client device 2010 and transmit the sensitive-data service command to the protected data area.

In the protected data area of the protected-data-area-processing unit 2120, data leakage may be fundamentally prevented. The protected data area may not provide all input/output (I/O) functions, including storage I/O, network I/O, and user I/O provided by a general OS.

Also, the protected data area may block access from the outside of the protected data area to the memory inside the protected data area based on the hardware function or virtualization function of a CPU.

Here, the protected data area is accessible only through the sensitive-data service endpoint. Because the sensitive-data service endpoint provides only a predefined service, other access may be blocked.

Accordingly, the data inside the protected data area is not accessible from the outside, whereby leakage of the data may be fundamentally prevented.

Here, the protected data area may include one or more endpoints for processing sensitive data, and may process the sensitive data using the endpoint invoked from the unprotected data area.

Here, the protected data area may include an endpoint invoked with the start of transmission of the sensitive data from the unprotected data area, an endpoint for receiving the decryption key, an endpoint for transmitting the sensitive data to the protected data area, and an endpoint invoked with the end of transmission of the sensitive data.

Here, the endpoint included in the protected data area may check a tag preset in the service parameter of the sensitive data and process the sensitive data using the information corresponding to the tag.

Figure 22:
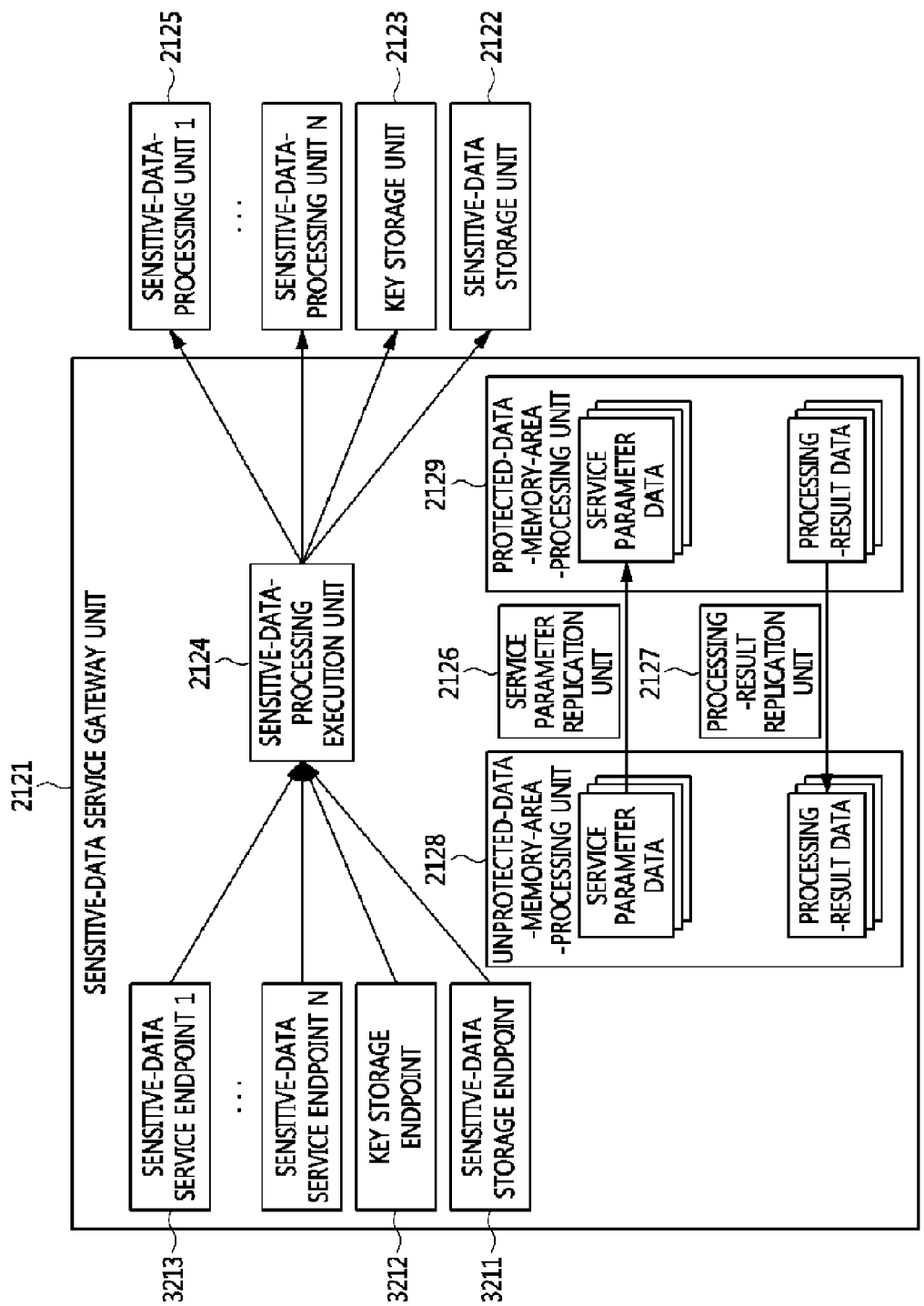
FIG. 22 is a block diagram that specifically shows an example of the sensitive-data service gateway unit illustrated in FIG. 21.

FIG. 22 is a block diagram that specifically shows an example of the sensitive-data service gateway unit illustrated in FIG. 21.

Referring to FIG. 22, the sensitive-data service gateway unit 2121 may further include a sensitive-data-processing execution unit 3214, a service parameter replication unit 2126, a processing-result replication unit 2127, an unprotected-data-memory-area-processing unit 2128, and a protected-data-memory-area-processing unit 2129.

The sensitive-data service invocation unit 2113, the key transmission unit 2112, and the sensitive-data transmission unit 2111 of the unprotected-data-area-processing unit 2110 may store the service parameter of the sensitive data, which is required for a service request, in the unprotected-data-memory-area-processing unit 2128 as a service parameter.

The service parameter replication unit 2126 may copy the corresponding sensitive data to the protected-data-memory-area-processing unit 2129 as a service parameter.

The protected-data-area-processing unit 2120 may store the processing result in the protected-data-memory-area-processing unit 2129 as processing-result data, and may copy the same as the processing-result data of the unprotected-data-memory-area-processing unit 2128 through the processing-result replication unit 2127.

Here, the protected-data-area-processing unit 2120 may store the service parameter of the sensitive data in the unprotected-data-memory-area-processing unit 2128 through the sensitive-data service gateway unit 2121, copy the service parameter of the sensitive data from the unprotected-data-memory-area-processing unit 2128 to the protected-data-memory-area-processing unit 2129 so as to be stored therein, and process the sensitive data using the service parameter of the sensitive data, which is stored in the protected-data-memory-area-processing unit 2129.

Here, the protected-data-area-processing unit 2120 may store the result of processing the sensitive data in the protected-data-memory-area-processing unit 2129 through the sensitive-data service gateway unit 2121, copy the result of processing the sensitive data from the protected-data-memory-area-processing unit 2129 to the unprotected-data-memory-area-processing unit 2128 so as to be stored therein, and transmit the result of processing the sensitive data, stored in the unprotected-data-memory-area-processing unit 2128, to the unprotected-data-area-processing unit 2110.

The sensitive-data-processing execution unit 3214 may invoke multiple units in the protected-data-area-processing unit 2120 (the sensitive-data-processing units 1 to N 2125, the sensitive-data decryption unit 2124, the key storage unit 2123, and the sensitive-data storage unit 2122), which correspond to multiple endpoints invoked by the unprotected-data-area-processing unit 2110.

Referring to FIG. 13, the sensitive-data-processing apparatus 2100 according to an embodiment of the present invention may be implemented in a computer system 1100 including a computer-readable recording medium. As shown in FIG. 13, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

Here, the sensitive-data-processing apparatus 2100 according to an embodiment of the present invention includes one or more processors 1110 and executable memory 1130 for storing at least one program executed by the one or more processors 1110. The at least one program may read sensitive data from a storage device 2200 to an unprotected data area, transmit the sensitive data from the unprotected data area to a protected data area using the sensitive-data storage endpoint of the protected data area, process the sensitive data in the protected data area using one or more endpoints when a command for a sensitive-data service requested by a client device 2010 is received from the unprotected data area, and transmit the result of processing the sensitive data from the unprotected data area to the client device 2010.

Here, the sensitive data may be processed in the protected data area through the enhanced management function for the data manipulation in response to the request of the user.

Here, the protected data area may be configured such that input/output functions provided by an operating system are blocked and such that memory access from the outside of the protected data area is blocked based on a hardware function and a virtualization function.

Here, in the unprotected data area, the at least one program may receive a decryption key for decrypting the encrypted sensitive data from the storage device 2200 and transmit the decryption key to the protected data area using the key storage endpoint of the protected data area.

Here, in the protected data area, the at least one program may decrypt the sensitive data using the decryption key and process the decrypted sensitive data in response to the command for the sensitive-data service requested by the client device, which is received from the unprotected data area using the sensitive-data service endpoint.

Here, in the protected data area, the at least one program may store the result of processing the sensitive data through a sensitive-data service gateway and transmit the same to the unprotected data area.

Here, in the protected data area, the at least one program may store the service parameter of the sensitive data in the unprotected data memory area through the sensitive-data service gateway, copy the service parameter of the sensitive data from the unprotected data memory area to the protected data memory area so as to be stored therein, and process the sensitive data using the service parameter of the sensitive data, which is stored in the protected data memory area.

Here, in the protected data area, the at least one program may store the result of processing the sensitive data in the protected data memory area through the sensitive-data service gateway, copy the result of processing the sensitive data from the protected data memory area to the unprotected data memory area so as to be stored therein, and transmit the result of processing the sensitive data, stored in the unprotected data memory area, to the unprotected data area.

Here, the protected data area may include one or more endpoints for processing the sensitive data, and may process the sensitive data using the endpoint invoked from the unprotected data area.

Here, the protected data area may include an endpoint invoked with the start of transmission of the sensitive data from the unprotected data area, an endpoint for receiving the decryption key, an endpoint for transmitting the sensitive data to the protected data area, and an endpoint invoked with the end of transmission of the sensitive data.

Here, the at least one program may enable the endpoint included in the protected data area to check a tag preset in the service parameter of the sensitive data and to process the sensitive data using information corresponding to the tag.

Figure 23:
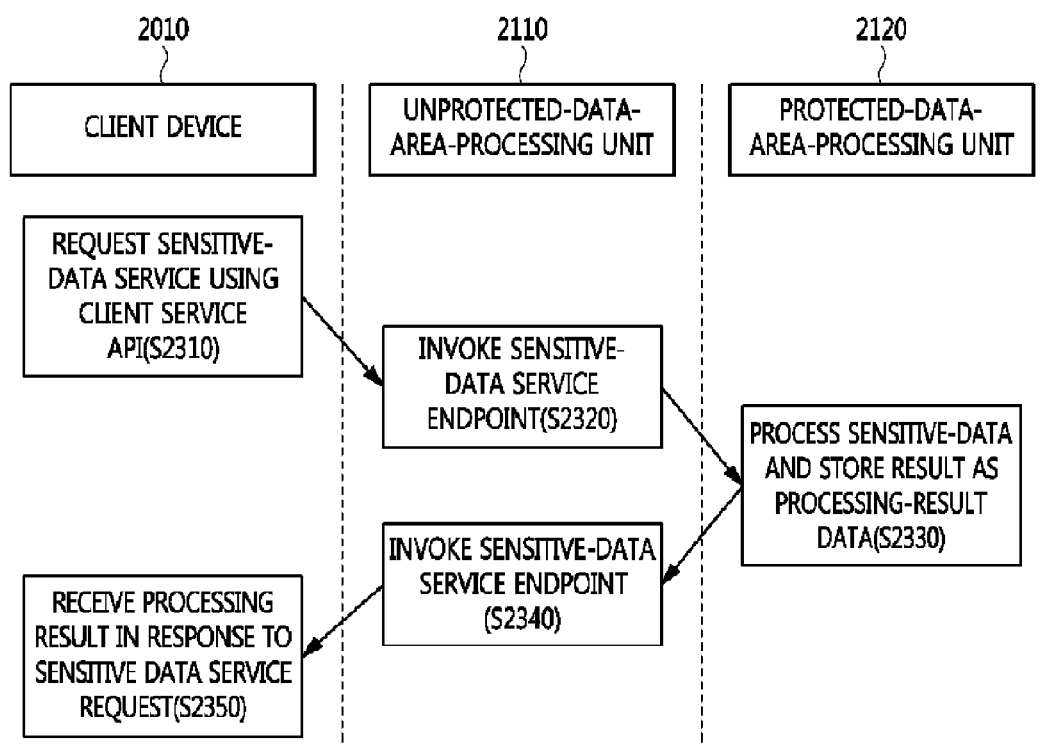
FIG. 23 is a flowchart that shows a method for processing sensitive data according to an embodiment of the present invention.

FIG. 23 is a flowchart that shows a method for processing sensitive data according to an embodiment of the present invention.

Referring to FIG. 23, in the method for processing sensitive data according to an embodiment of the present invention, first, a client device 2010 may request a sensitive-data service at step S2310 using a client service API of a sensitive-data-processing apparatus 2100.

Also, at step S2310, in an unprotected data area, sensitive data may be read from a storage device, and the sensitive data may be transmitted to a protected data area using a sensitive-data storage endpoint.

Here, at step S2310, in the unprotected data area, a decryption key, which is necessary in order to decrypt the encrypted sensitive data, may be received from the storage device, and the decryption key may be transmitted to the protected data area using a key storage endpoint of the protected data area.

Also, in the method for processing sensitive data according to an embodiment of the present invention, the unprotected-data-area-processing unit 2110 of the sensitive-data-processing apparatus 2100 may issue a sensitive-data service command to the protected-data-area-processing unit 2120 using a sensitive-data service endpoint at step S2320.

Also, in the method for processing sensitive data according to an embodiment of the present invention, the protected-data-area-processing unit 2120 of the sensitive-dataprocessing apparatus 2100 may process the sensitive data and store the result thereof as processing-result data, and may transmit the result of processing the sensitive data to the unprotected-data-area-processing unit 2110 at step S2330.

That is, at step S2330, when a command for the sensitive-data service requested by the client device 2010 is received from the unprotected-data-area-processing unit 2110, the sensitive data may be processed using one or more endpoints.

Here, at step S2330, the sensitive data may be decrypted using the decryption key in the protected data area, and the decrypted sensitive data may be processed by the command for the sensitive-data service requested by the client device 2010, which is received from the unprotected data area using the sensitive-data service endpoint.

Here, at step S2330, in the protected data area, the result of processing the sensitive data may be stored through the sensitive-data service gateway, and the result of processing the sensitive data may be transmitted to the unprotected-data-area-processing unit 2110.

Here, at step S2330, in the protected data area, the service parameter of the sensitive data may be stored in the unprotected data memory area through the sensitive-data service gateway, the service parameter of the sensitive data is copied from the unprotected data memory area to the protected data memory area so as to be stored therein, and the sensitive data may be processed using the service parameter of the sensitive data, which is stored in the protected data memory area.

Here, at step S2330, in the protected data area, the result of processing the sensitive data may be stored in the protected data memory area through the sensitive-data service gateway, the result of processing the sensitive data may be copied from the protected data memory area to the unprotected data memory area so as to be stored therein, and the result of processing the sensitive data, stored in the unprotected data memory area, may be transmitted to the unprotected data area.

Also, in the method for processing sensitive data according to an embodiment of the present invention, the unprotected-data-area-processing unit 2110 may transmit the result of processing the sensitive data to the client device 2010 at step S2340.

Also, in the method for processing sensitive data according to an embodiment of the present invention, the client device 2010 may receive the result of processing the sensitive data from the sensitive-data-processing apparatus 2100 at step S2350 in response to the sensitive data service request.

Figure 24:
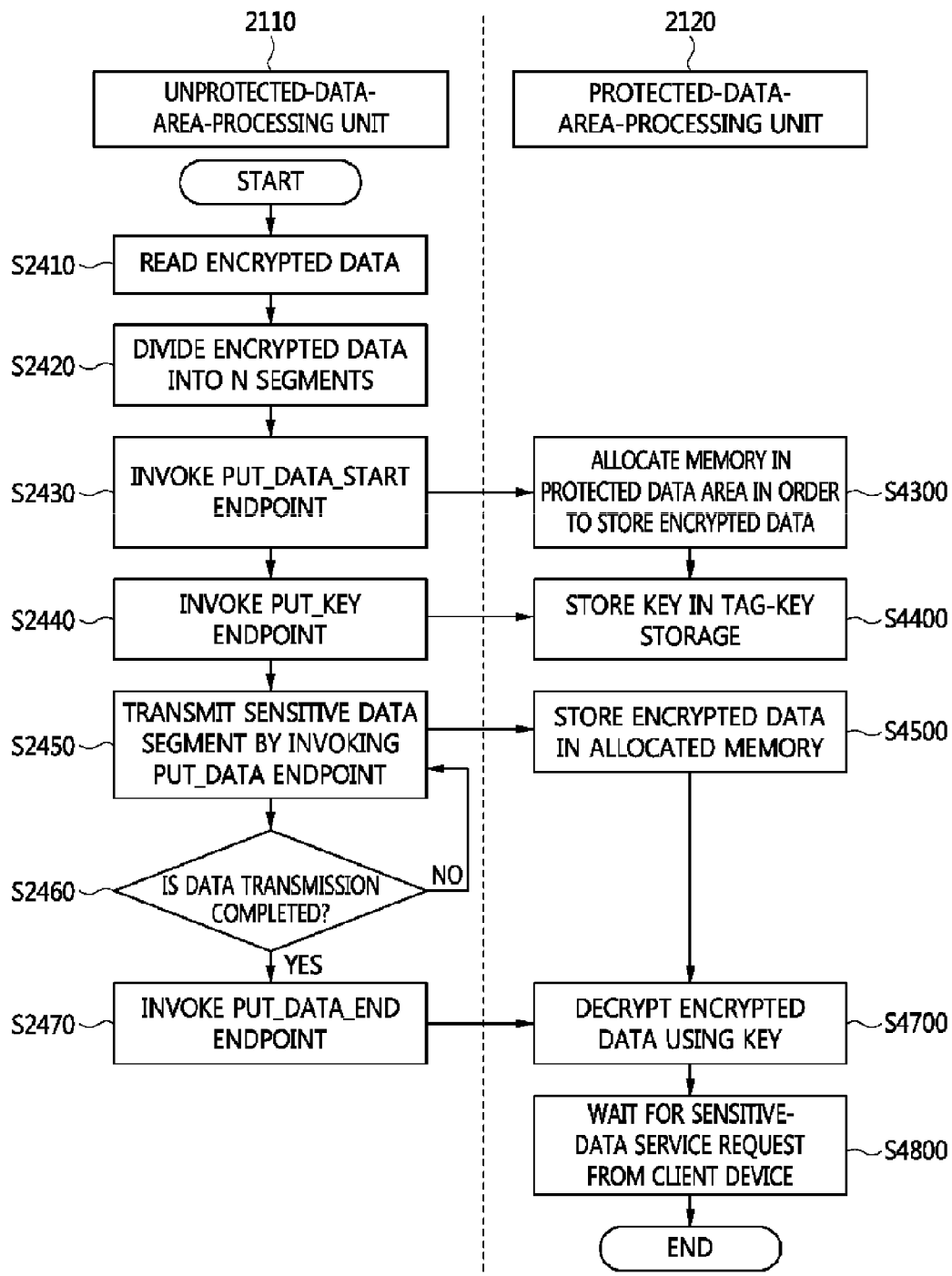
FIG. 24 is a flowchart that shows a method for processing sensitive data in an unprotected-data-area-processing unit and a protected-data-area-processing unit according to an embodiment of the present invention.

FIG. 24 is a flowchart that shows a sensitive-data-processing method in an unprotected-data-area-processing unit and a protected-data-area-processing unit according to an embodiment of the present invention.

Referring to FIG. 24, in the sensitive-data-processing method according to an embodiment of the present invention, first, the unprotected-data-area-processing unit 2110 may read encrypted sensitive data from a cloud storage device 2200 at step S2410.

Also, in the sensitive-data-processing method according to an embodiment of the present invention, the encrypted sensitive data may be divided into N segments at step S2420.

Also, in the sensitive-data-processing method according to an embodiment of the present invention, a 'put_data_start' endpoint is invoked, whereby the start of transmission of the encrypted data may be announced to the protected-data-area-processing unit 2120 at step S2430.

Here, 'tag', corresponding to a service parameter 1, indicates a tag for identifying the encrypted sensitive data, and a service parameter 2 may indicate the total size of the encrypted data.

Also, in the sensitive-data-processing method according to an embodiment of the present invention, the protected-data-area-processing unit 2120 allocates memory with the size specified in the endpoint inside the protected data area, thereby preparing for storing the encrypted sensitive data at step S4300.

Also, in the sensitive-data-processing method according to an embodiment of the present invention, the unprotected-data-area-processing unit 2110 may transmit a decryption key for decrypting the encrypted sensitive data to the protected-data-area-processing unit 2120 using a 'put_key' endpoint at step S2440.

Here, 'tag', corresponding to a service parameter 1, indicates a tag for identifying the encrypted sensitive data, and a service parameter 2 indicates the key for decrypting the encrypted sensitive data.

Also, in the sensitive-data-processing method according to an embodiment of the present invention, the protected-data-area-processing unit 2120 may store both the decryption key and the tag in the tag-key storage unit 2123a of the key storage unit 2123 at step S4400.

Also, in the sensitive-data-processing method according to an embodiment of the present invention, the unprotected-data-area-processing unit 2110 may divide the encrypted sensitive data into segments and transmit the respective segments to the protected-data-area-processing unit 2120 using a 'put_data' endpoint at step S2450.

Here, 'tag', corresponding to a service parameter 1, indicates a tag for identifying the encrypted sensitive data, 'data', corresponding to a service parameter 2, indicates the encrypted data segment to be transmitted, 'size', corresponding to a service parameter 3, indicates the size of the data to be transmitted, and 'segment number', corresponding to a service parameter 4, indicates the segment number of the segment to be currently transmitted.

Here, the 'put_data' endpoint transmits data in units of segments, and may be repeatedly executed at step S2460 until all of the encrypted data has been completely transmitted.

Also, in the sensitive-data-processing method according to an embodiment of the present invention, the unprotected-data-area-processing unit 2110 may notify the protected-data-area-processing unit 2120 of the completion of transmission of the data corresponding to the tag using a 'put_data_end' endpoint at step S2470.

Here, 'tag', corresponding to a service parameter 1, is a tag for identifying the encrypted data.

Also, in the sensitive-data-processing method according to an embodiment of the present invention, the protected-data-area-processing unit 2120 may decrypt the received encrypted sensitive data using the key stored in the tag-key storage unit 2123a at step S4700 in response to invocation of the 'put_data_end' endpoint.

Also, in the sensitive-data-processing method according to an embodiment of the present invention, after step S4700, a request for a sensitive-data service from the client device 2010 may be waited for at step S4800.

Figure 25:
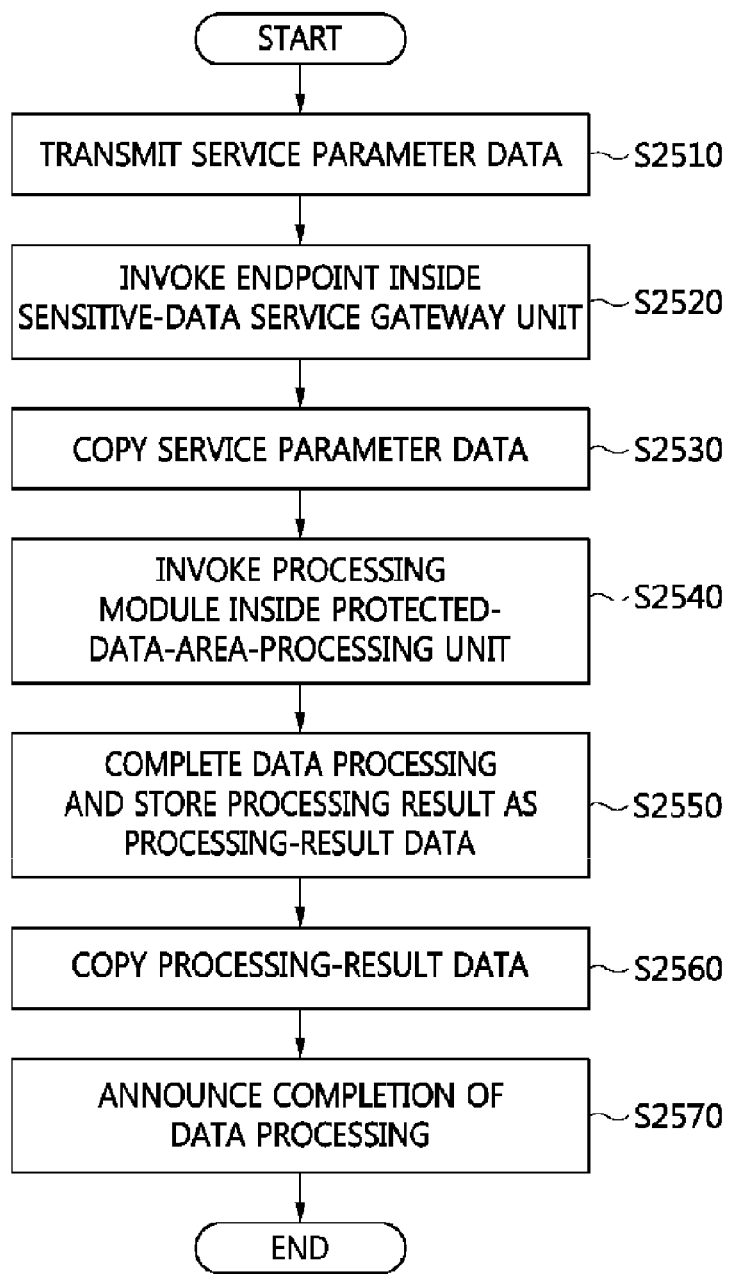
FIG. 25 is a flowchart that shows a method for processing sensitive data in a sensitive-data service gateway unit according to an embodiment of the present invention.

FIG. 25 is a flowchart that shows a sensitive-data-processing method in a sensitive-data service gateway unit according to an embodiment of the present invention.

Referring to FIG. 25, in the sensitive-data-processing method in the sensitive-data service gateway unit according to an embodiment of the present invention, first, service parameter data may be received at step S2510.

Here, at step S2510, the service parameter of the sensitive data, which is required for a service request, may be stored in the unprotected-data-memory-area-processing unit 2128 as a service parameter.

In the sensitive-data-processing method in the sensitive-data service gateway unit according to an embodiment of the present invention, endpoints inside the sensitive-data service gateway unit 2121 may be invoked at step S2520.

Also, in the sensitive-data-processing method in the sensitive-data service gateway unit according to an embodiment of the present invention, the service parameter replication unit 2126 may copy the corresponding sensitive data to the protected-data-memory-area-processing unit 2129 as a service parameter at step S2530.

Also, in the sensitive-data-processing method in the sensitive-data service gateway unit according to an embodiment of the present invention, processing units inside the protected-data-area-processing unit may be invoked at step S2540.

That is, at step S2540, multiple units inside the protected-data-area-processing unit 2120 (the sensitive-data-processing units 1 to N 2125, the sensitive-data decryption unit 2124, the key storage unit 2123, and the sensitive-data storage unit 2122), which correspond to the invoked multiple endpoints, may be invoked.

Also, in the sensitive-data-processing method in the sensitive-data service gateway unit according to an embodiment of the present invention, data processing is completed, and the processing result may be stored as the processing-result data at step S2550.

That is, at step S2550, the result of processing the sensitive data may be stored in the protected-data-memory-area-processing unit 2129 as the processing-result data.

Also, in the sensitive-data-processing method in the sensitive-data service gateway unit according to an embodiment of the present invention, the processing-result data may be copied at step S2560.

That is, at step S2560, through the processing-result replication unit 2127, the processing-result data may be copied to the unprotected-data-memory-area-processing unit 2128 as the processing-result data thereof.

Here, at steps S2510 to S2550, through the sensitive-data service gateway unit 2121, the service parameter of the sensitive data may be stored in the unprotected-data-memory-area-processing unit 2128, the service parameter of the sensitive data may be copied from the unprotected-data-memory-area-processing unit 2128 to the protected-data-memory-area-processing unit 2129 so as to be stored therein, and the sensitive data may be processed using the service parameter of the sensitive data, which is stored in the protected-data-memory-area-processing unit 2129.

Here, at steps S2550 to S2570, through the sensitive-data service gateway unit 2121, the result of processing the sensitive data may be stored in the protected-data-memory-area-processing unit 2129, the result of processing the sensitive data may be copied from the protected-data-memory-area-processing unit 2129 to the unprotected-data-memory-area-processing unit 2128 so as to be stored therein, and the result of processing the sensitive data, stored in the unprotected-data-memory-area-processing unit 2128, may be transmitted to the unprotected-data-area-processing unit 2110.

Figure 26:
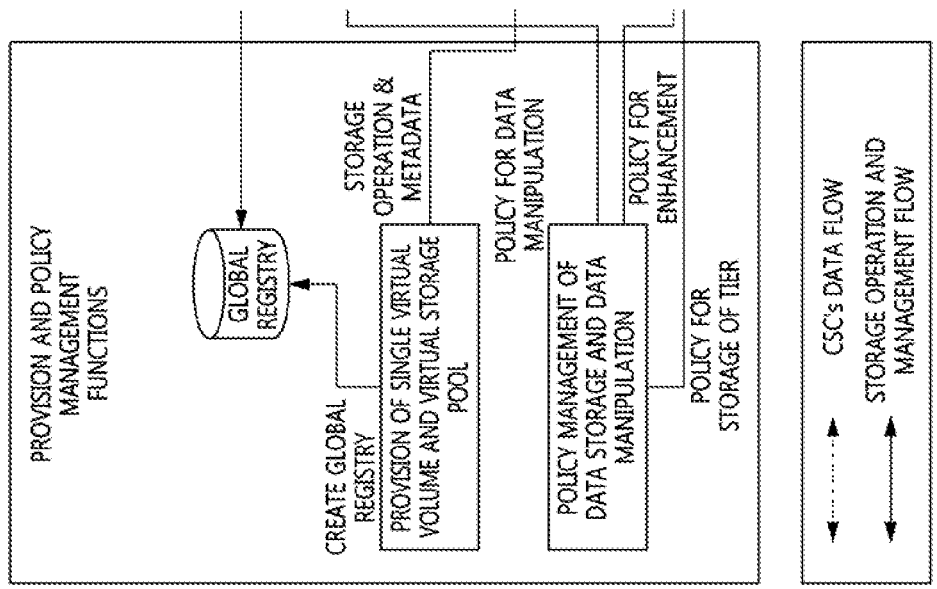
FIG. 26 and FIG. 27 are block diagrams that specifically show an integrated-storage management function according to an embodiment of the present invention.
Figure 27:
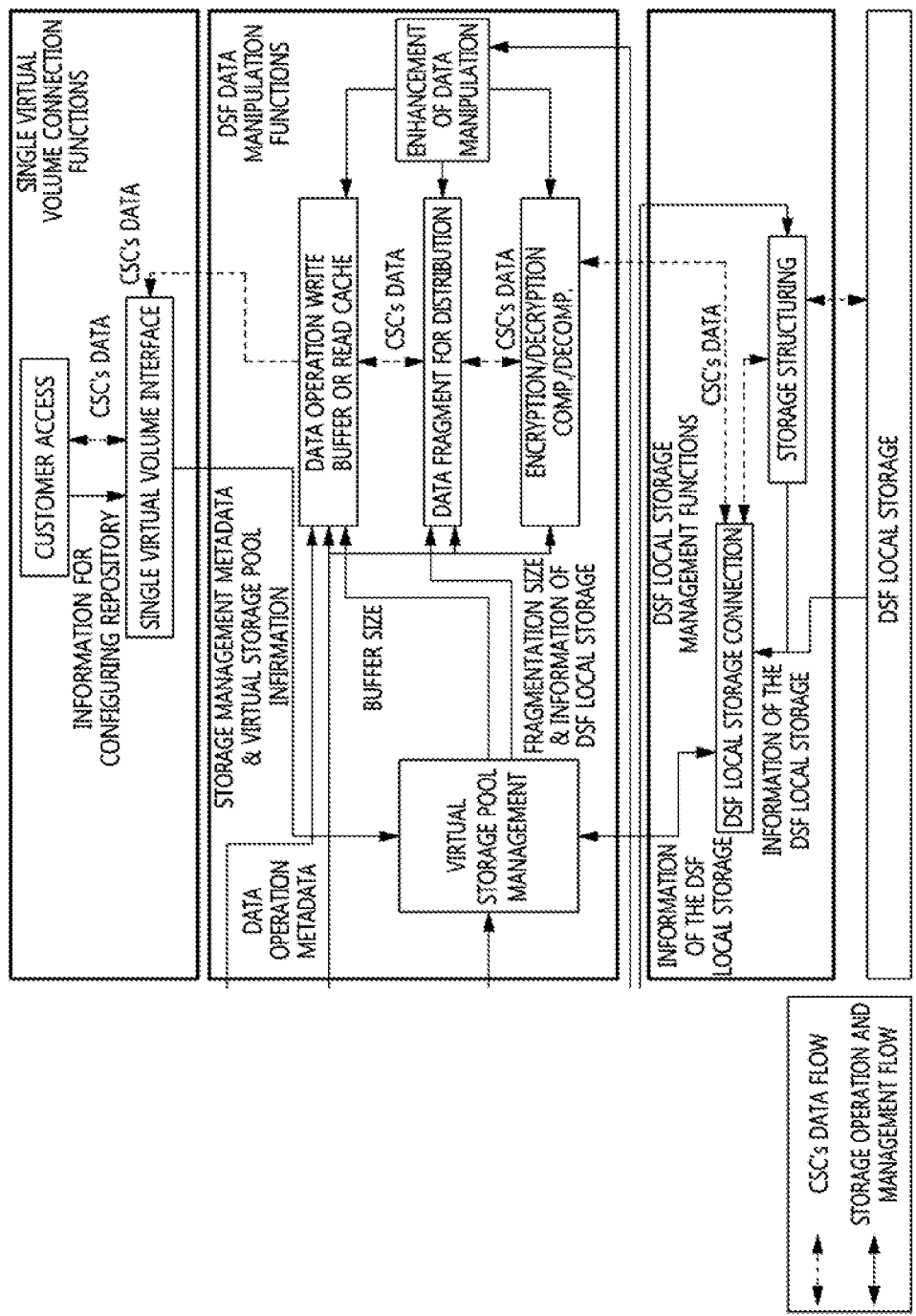

FIG. 26 and FIG. 27 are block diagrams that specifically show an integrated storage management function according to an embodiment of the present invention.

Referring to FIG. 26 and FIG. 27, data operation metadata may be transmitted and received between a global registry and a data operation write buffer or read cache.

A component for provision of single virtual volume and virtual storage pool may transmit and receive storage operations and metadata to and from a component for virtual storage pool management.

A component for policy management of data storage and data manipulation may transmit and receive a policy for data manipulation to and from the data operation write buffer or read cache.

The component for policy management of data storage and data manipulation may transmit and receive a policy for enhancement to and from a component for enhancement of data manipulation.

Here, the data manipulation enhancement function receives policy for performance enhancement to reflect the policy about performance.

In order to protect sensitive data, data operations are performed in a secure region (protected data area). For example, the secure region may be a logical area such as RAM, NVMe or SSD accessed only through a secure interface (API) or a secure gateway.

In this case, processing sensitive data in the secure region may consist of copying encrypted sensitive data from DSF local storage to a secure region (through a secure gateway or API); decrypting the encrypted sensitive data in the secure region; processing CSU's requested data operations in the secure region; returning the data operation results to the CSU from the secure region.

The component for policy management of data storage and data manipulation may transmit and receive a policy for storage of a tier to and from a component for storage structuring.

Also, DSF function requirements according to an embodiment of the present invention may be described as follows.

CSP:DMP may provide recovery of data of CSC:CSU in the event of a system failure.

CSP:DMP may provide resilience and cost efficiency of storage space by providing migration of DSF data to available DSF local storage.

CSP:DMP may provide verification of the validity of DSF data for data manipulation in order to check data integrity.

CSP:DMP may provide consistency of data of CSC:CSU for replicated DSF data.

CSP:DMP may support transparency of data of CSC:CSU.

CSP:SFP may provide optimization of a single virtual volume depending on the purpose of CSC:CSU.

CSP:SFP may provide the backup of a global registry for high availability.

Also, the data manipulation unit 120 according to an embodiment of the present invention may provide an enhanced management function for data manipulation.

The enhanced management function may replicate the fragmentation for distribution to DSF local storage.

Replication using the same data is distributed to the DSF local storage, and may be shared with another server in another place for high availability.

The enhanced management function may enable the most recent data to be maintained between the replication and original data.

The enhanced management function may determine distribution of the replication depending on information about the DSF local storage.

For example, based on the DSF local storage information, low-speed storage may be easily excluded from the DSF local storage for distribution of the replication.

The enhanced management function may enable the DSF local storage to be backed up by writing a snapshot.

For example, the snapshot may show data information at a specific time in order to quickly provide data replication. Various types of snapshot techniques, such as copy-on-write snapshot, clone, split-mirror snapshot, redirect-on-write snapshot, and the like, may be used.

The enhanced management function may enable the DSF local storage to be recovered using the most recent snapshot.

For example, the enhanced management function is configured such that, when the snapshot is used, data may be quickly and easily accessed for backup and recovery.

The enhanced management function may enable data in the DSF local storage to be migrated when the DSF local storage is exhausted or failed.

For example, migration is configured such that, when the existing storage is excluded from the DSF local storage in response to a request from CSC due to the low performance or insufficient capacity thereof, data is moved from the existing storage to new storage and access is made to the new storage, rather than to the existing storage.

The enhanced management function may enable a DSF global registry to be backed up for high availability.

For example, the backup of the global registry enables failover in such a way that an auxiliary DSF global registry provides a single virtual volume and a virtual storage pool.

The enhanced management function may provide an error correction function in order to prevent data loss.

For example, the error correction function may correspond to technology for preventing data loss during data transmission, such as a Cyclic Redundancy Code (CRC), a checksum, an encryption hash function, forward error correction, or the like.

The enhanced management function may maintain the location of the most recent data in a global registry for data transparency.

Data transparency may be the capability to access and work on data regardless of the location thereof or whether the reported data is accurate and comes from an official source.

The enhanced management function may prevent data leakage during processing of sensitive data in order to protect the data.

The sensitive data may be financial information, health information, private identification data, and the like.

Here, the sensitive data may be processed by the above-described apparatus 2100 for processing sensitive data.

The apparatus 2100 for processing sensitive data adds a protected data area, processes data in the protected data area, and blocks all I/O interfaces, thereby preventing invasion from the outside.

The protected data area may be a hardware or software structure for copying sensitive data to a protected area with a security gateway or API, decrypting the encrypted sensitive data, processing CSC's service operation, and returning the result.

The enhanced management function may apply an enhanced policy.

The enhanced policy may include policies of replication, backups, snapshots, migration, error correction, data protection, and the like.

In this case, the sensitive data may be processed according to the data protection policy.

In this case, the apparatus 2100 may process the sensitive data in the protected data area by using the enhanced management function according to the data protection policy when the request for processing the sensitive data for data protection (security) from the user.

Also, a data fragmentation function for DSF distribution according to an embodiment of the present invention may provide the following functions.

CSP:SFP may provide information about the performance of DSF local storage in the storage management metadata.

CSP:SFP may provide virtual storage pool optimization in consideration of the performance of the DSF local storage.

The data fragmentation function for distribution may be configured such that the virtual storage pool management unit receives information about the DSF local storage and a fragment size.

Examples of the DSF local storage information may include credentials, an access mechanism, an endpoint, storage performance, and a storage capacity.

The data fragmentation function for distribution may enable setting a maximum fragment size.

The data fragmentation function for distribution may enable the data of CSC to be collected from a write buffer when the buffer is filled with data.

The maximum fragment size may be set depending on the I/O bandwidth of storage, a storage capacity, whether a cache is used, and the like. When the fragment size is large, a large amount of data may be copied to the DSF local storage, and when the fragment size is small, it may be difficult to match the data to the cache size.

The data fragmentation function for distribution may verify a fragment size in virtual storage pool management.

The data fragmentation function for distribution may enable data of CSC to be received from a write buffer in order to store the same in the DSF local storage.

The data fragmentation function for distribution may enable the requested data of CSC to be transmitted from the DSF local storage to the cache in the event of cache miss.

The data fragmentation function for distribution may verify and apply a fragmentation policy.

Examples of the fragmentation policy may include a fragment size, the number of fragments, the number of parity bits, the number of fragments in each storage, and the like.

The present invention may fundamentally prevent the leakage of sensitive data stored in storage while supporting a service for processing the sensitive data.

Also, the present invention may provide a sensitive-data-processing service by decrypting encrypted data stored in storage and fundamentally prevent the leakage of sensitive data.

Also, the present invention may improve the performance of read/write operations in integrated storage in which cloud storage and on-premise storage are integrated.

Also, the present invention may enable cloud storage and on-premise storage included in integrated storage to provide a data storage service with the same performance.

Also, the present invention may move user data based on the resilience and cost efficiency of storage space.

Figure 28:
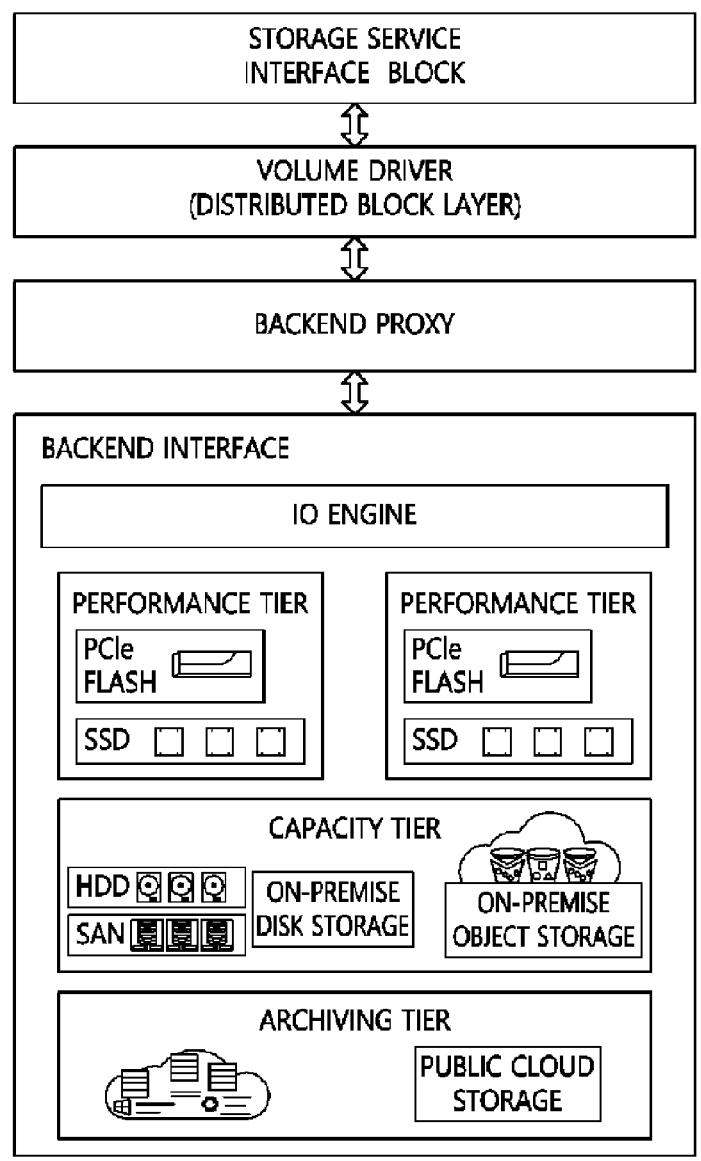
FIG. 28 is a view illustrating an automatic hierarchical structure of a cloud infrastructure system according to an embodiment of the present invention.

FIG. 28 is a view illustrating an automatic hierarchical structure of a cloud infrastructure system according to an embodiment of the present invention.

Referring to FIG. 28, it is understood that an automatic hierarchical structure of a cloud infrastructure system according to an embodiment of the present invention is illustrated.

Cloud storage according to an embodiment of the present invention may perform an automatic tiering function for integrated storage based on a policy.

Here, an integrated storage management apparatus 100 according to an embodiment of the present invention may perform an automatic tiering function for integrated storage based on a policy.

That is, the integrated storage management apparatus 100 configured to perform the automatic tiering function for integrated storage based on a policy may correspond to the apparatus for managing integrated storage supporting a hierarchical structure.

Referring to FIG. 2, the backend storage management unit 140 may perform the automatic tiering function for integrated storage based on a policy.

The apparatus for managing integrated storage supporting a hierarchical structure according to an embodiment of the present invention may automatically store data in various storage tiers in a distributed manner.

The apparatus for managing integrated storage supporting a hierarchical structure, which is a CiS-operating platform, according to an embodiment of the present invention may manage various storage devices, such as main memory, an SSD, NVME, an HDD, an SAS, iSCSI storage, object storage, public cloud storage, and the like.

The storage devices managed by the integrated storage management apparatus 100 according to an embodiment of the present invention may have different characteristics in terms of access speed, the capacity, and the like.

For example, main memory provides the highest access speed, but provides the smallest storage capacity.

Also, an SSD, an HDD, iSCSI storage, and public storage may be accessed at respective speeds that decrease in the order in which they are listed, but may provide more storage capacity.

The apparatus for managing integrated storage supporting a hierarchical structure may tier the storage devices based on the characteristics thereof.

Here, the apparatus for managing integrated storage supporting a hierarchical structure may store initially created data in high-speed storage, and may move the data to a lower tier of storage when the data is less frequently accessed.

Here, the apparatus for managing integrated storage supporting a hierarchical structure may finally store the data in the public cloud storage when access to the data is finished.

Here, the apparatus for managing integrated storage supporting a hierarchical structure may move data between various storage tiers depending on the characteristics of the data.

Here, the storage tiers managed by the apparatus for managing integrated storage supporting a hierarchical structure may include a performance tier, a capacity tier, and an archiving tier.

Here, the storage tiers may be configured based on a policy.

As illustrated in FIG. 28, the performance tier may include all memory devices or flash storage (PCIe, flash, and an SSD) at the backend layer.

The capacity tier may include multiple data centers or on-premise storage for securely storing data in local storage devices (an HDD, SAN, on-premise disk storage, and on-premise object storage).

The archiving tier may include public cloud storage for securely storing data.

Figure 29:
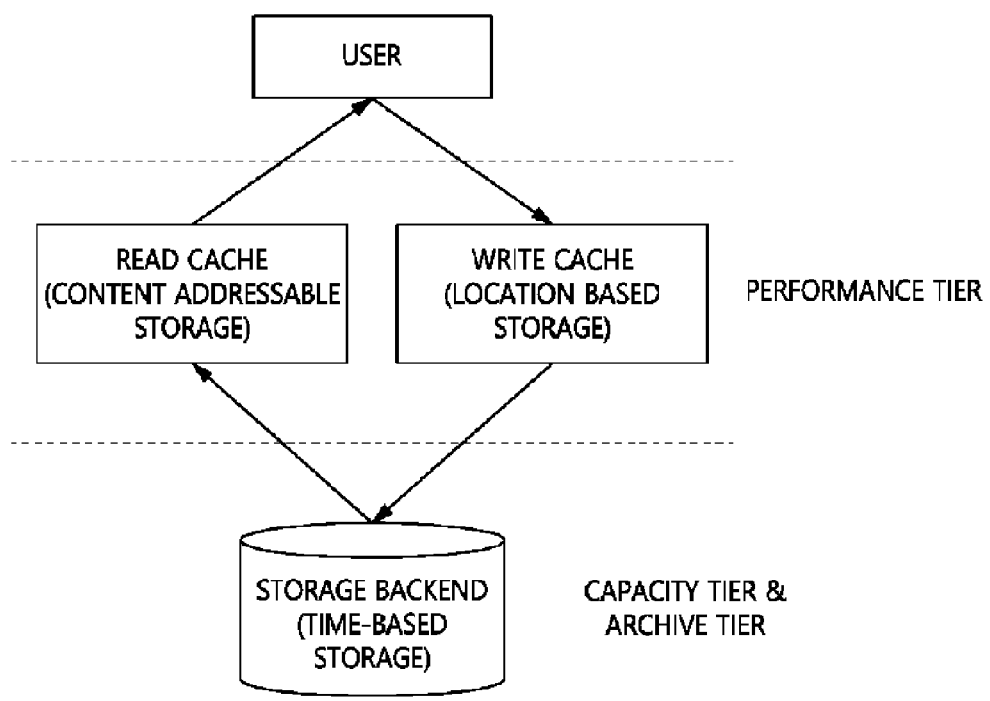
FIG. 29 is a view illustrating the type of each storage device in a hierarchical structure according to an embodiment of the present invention.

FIG. 29 is a view illustrating the type of each storage device in a hierarchical structure according to an embodiment of the present invention.

Referring to FIG. 29, it is understood that the type of each storage device in a hierarchical structure is illustrated.

Here, the apparatus for managing integrated storage supporting a hierarchical structure may automatically allocate the best possible storage tier for a specific data volume using a data movement or replication function.

Here, the apparatus for managing integrated storage supporting a hierarchical structure may determine storage tiers based on the performance, capacity and archiving of storage and the policy for data storage.

Here, the storage tiers may hierarchically organized storages to enhance data access by allocating storage in high speed storage such as RAM based disk or SSD for caching over the low speed storage that CSC data is stored. Frequently accessed data is stored in the high-speed storage.

Here, the apparatus for managing integrated storage supporting a hierarchical may structure monitors performance of storage including cache and DSF local storage.

Here, the performance of storage may include transmission speed, capacity, read/write speed, and etc.

Here, the apparatus for managing integrated storage supporting a hierarchical structure may assign storage types for performing various functions in order to improve storage management performance, and may access the hierarchical structure thereof for read/write operations. The assigned storage types are as follows.

Here, the apparatus for managing integrated storage supporting a hierarchical may structure configures hierarchical storage structure by using heterogeneous storage to support high performance.

Here, the apparatus for managing integrated storage supporting a hierarchical may structure applies policy for data storage related with tiering. for storage types.

Here, the storage types may include tiering location-based storage, time-based storage and content addressable storage (CAS).

The location-based storage management strategy may be configured to store the accurate location at which data is placed.

Here, the location-based storage stores the location where the data may placed. This storage may applied in write buffer.

That is, the apparatus for managing integrated storage supporting a hierarchical structure stores the accurate location of storage in which data (an actual value) is stored in metadata of each address.

In the case of the location-based storage management strategy, even though data is frequently changed, a read operation may be very quickly performed because the precise location of the data is known.

However, because the location-based storage retains no history, when an address is overwritten, the address contains the location of new data, which causes the location of an old value to be lost.

The location-based storage management strategy may be applied in a write cache, and may be assigned to a performance tier.

The time-based storage management strategy is configured to identify the time at which data is recorded using time information.

Here, the time-based storage stores the log of time that data may stored and whenever the data may changed, the data may only updated by the difference based on the log of time. This storage may applied in DSF local storage for zero copy snapshot.

That is, the apparatus for managing integrated storage supporting a hierarchical structure may sequentially perform a log-type approach configured to log all data write operations and to store the same.

Here, whenever there is new data to record, the apparatus for managing integrated storage supporting a hierarchical structure may add time information to the end of a log, rather than finding a suitable location.

Here, because all of the records of a volume (in which all data write operations are added) are always retained, the time-based storage management strategy may enable implementation of a snapshot by finishing the log and starting a new log file.

However, in the case of the time-based storage management strategy, data is distributed to another log file (snapshot) after a certain period of time, which may increase the amount of time taken to read data.

Also, in the case of the time-based storage management strategy, when it is attempted to find the most recent value written for an address, it is necessary to move from the last log file to the first log file in order to identify the last time at which the address is written.

Also, in the case of the time-based storage management strategy, an addition strategy cannot be performed indefinitely, and a garbage collection process may be used in order to secure data space required for a long retention time period.

The time-based storage management strategy may be applied in the storage backend, and may be assigned to a capacity tier and an archive tier.

The content-addressable storage (CAS) strategy may display an identifier (e.g., a hash value) for each write operation.

Here, the content-addressable storage may use hash and the data may stored as key/value pairs in storage. This storage may applied in read cache.

The apparatus for managing integrated storage supporting a hierarchical structure may calculate a hash value from the content of stored information.

The apparatus for managing integrated storage supporting a hierarchical structure may store the hash value and the data as a key/value pair.

That is, when a matching hash value is present, this may indicate that data is present after the corresponding hash key.

The apparatus for managing integrated storage supporting a hierarchical structure may check whether an object is stored only once using a hash value.

Therefore, the content-addressable storage strategy may be mainly used in a storage solution providing a deduplication function. However, the content-addressable storage strategy cannot be used for writing or efficiently storing a large amount of data, and slight overhead may be incurred in order to maintain sorted hashes. Therefore, the content-addressable storage strategy may be used only when data is not frequently changed.

The content-addressable storage strategy may be applied in a read cache, and may be assigned to a performance tier.

The apparatus for managing integrated storage supporting a hierarchical structure may support a hierarchical structure for each storage unit in consideration of the advantages and disadvantages of the above-described storage strategies.

The apparatus for managing integrated storage supporting a hierarchical structure may perform caching using an SSD in a system or a PCIe flash card.

The apparatus for managing integrated storage supporting a hierarchical structure may include a read cache, a write cache, and a storage backend.

The read cache is implemented as content-addressable storage (CAS), thereby providing deduplication and fast performance for frequently used data.

The write cache may be implemented using location-based storage.

The storage backend may be implemented using time-based storage by aggregating write operations occurring at a specific time.

The time-based storage management strategy may provide functions such as zero-copy snapshot, replication, and easy replication.

Figure 30:
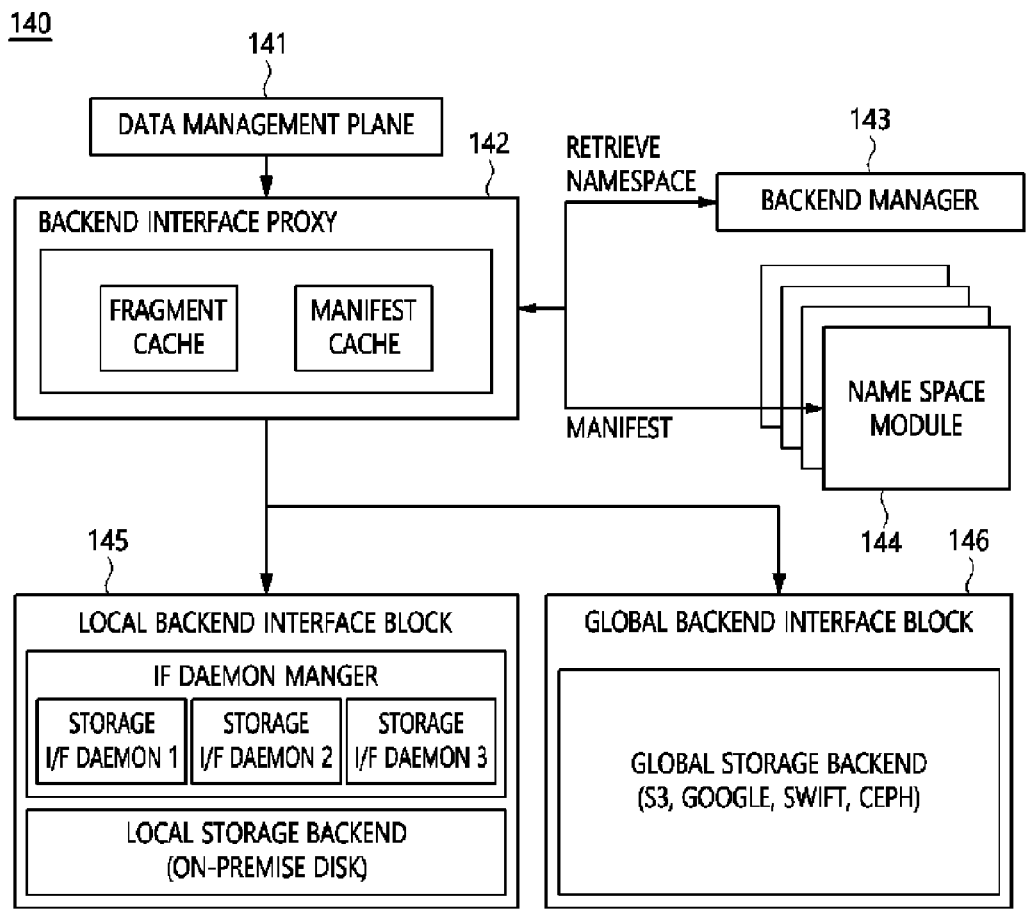
FIG. 30 is a block diagram illustrating an apparatus for managing integrated storage supporting a hierarchical structure according to an embodiment of the present invention.
Figure 31:
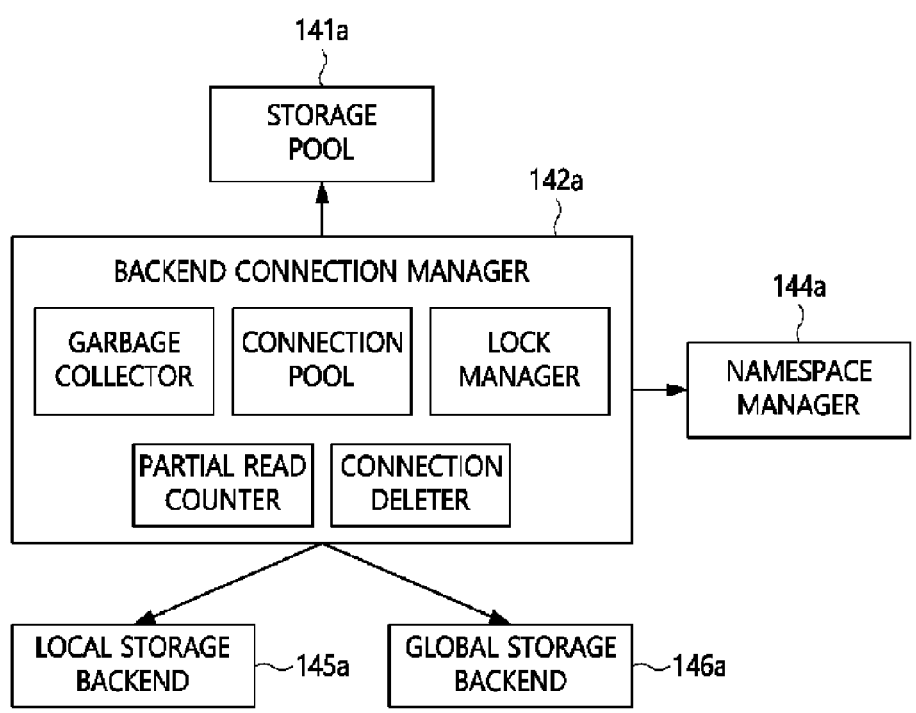
FIG. 31 is a block diagram specifically illustrating an example of the backend interface proxy unit illustrated in FIG. 30.

FIG. 30 is a block diagram illustrating an apparatus for managing integrated storage supporting a hierarchical structure according to an embodiment of the present invention. FIG. 31 is a block diagram specifically illustrating an example of the backend interface proxy unit illustrated in FIG. 30.

Referring to FIG. 30, the apparatus for managing integrated storage supporting a hierarchical structure according to an embodiment of the present invention includes a data management unit 141, a backend interface proxy unit 142, a backend management unit 143, a namespace management unit 144, a local backend interface management unit 145, and a global backend interface management unit 146.

Here, the above components of the apparatus for managing integrated storage supporting a hierarchical structure may be included in the backend storage management unit 140 of the integrated storage management apparatus 100 illustrated in FIG. 2.

A CiS-operating platform such as the integrated storage management apparatus 100 according to an embodiment of the present invention may provide a backend storage interface function for integrating heterogeneous storage devices and providing data operation flexibility based on performance or scalability through the backend storage management unit 140.

The backend interface proxy unit 142 may support the interfaces of heterogeneous storage devices in order to make the various storage devices appear to the data management unit 141 as a single virtual storage space.

The backend interface proxy unit 142 may connect the configured backend storage devices with the data management layer of the data management unit 141, and may implement a proxy for storing data delivered by the data management layer depending on the storage format of the backend storage.

The backend interface proxy unit 142 may also perform a storage router function for connecting user storage to a back end, and may perform the function of storing a data object, coming from a volume driver, in the back end.

The backend interface proxy unit 142 may manage storage devices such that a single proxy is present for each storage device registered in a pool.

The backend interface proxy unit 142 may connect the local storage backend with the global storage backend.

The local storage backend may include on-premise storage devices present in a single node and a cluster node.

The global storage backend may include a storage service based on a public or private cloud.

The local backend interface management unit 145 may perform a connection method and read/write functions for the local storage backend.

Here, the local backend interface management unit 145 may store the result of performing the read/write functions in the final storage layer.

The global backend interface management unit 146 may perform a connection method and read/write functions for the global storage backend.

Here, the global backend interface management unit 146 may store the result of performing the read/write functions in the final storage layer.

Unlike the local storage backend, the global storage backend may be configured such that a user's private repository is present in private or public cloud storage accessible through a connection to a cloud storage service, rather than being present in a system node.

Therefore, the global backend interface management unit 146 may manage information about the connection to the cloud storage service.

Referring to FIG. 31, the backend interface proxy unit 142 may include a backend connection management unit 142*a*.

The backend connection management unit 142*a* may include a garbage collector, a connection pool, a lock manager, a partial read counter, and a connection deleter.

The garbage collector may process and modify content in which an error occurs in the system.

The storage pool may provide an interface for connection.

The lock manager may provide a locking mechanism in the system.

The partial read counter may execute a partial read command in the system.

The connection deleter may perform the function of deleting the connection to the back end in the system.

Figure 32:
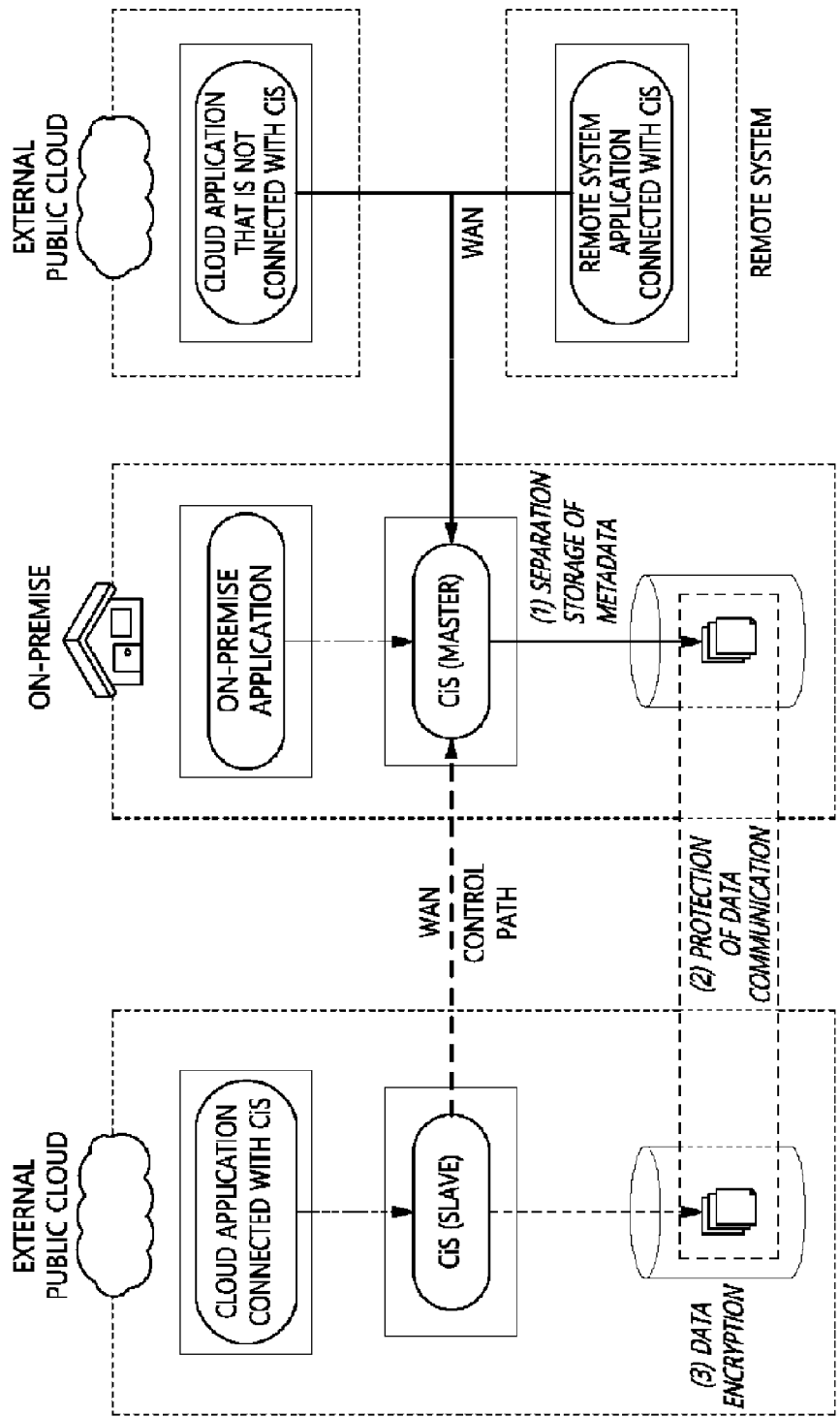
FIG. 32 is a view illustrating an environment in which an apparatus for managing integrated storage supporting a hierarchical structure according to an embodiment of the present invention operates.

FIG. 32 is a view illustrating an environment in which an apparatus for managing integrated storage supporting a hierarchical structure according to an embodiment of the present invention operates.

Referring to FIG. 32, a cloud data access function for enabling an application to use data in a public cloud connected with CiS, in a remote system, and in an on-premise environment in which CiS operates is illustrated.

The CiS-operating platform may provide the function of delivering data stored through CiS to external cloud-computing resources through an application in the state in which the security of the data is ensured. Here, the executed application may be connected with the CiS system. Accordingly, the risk of exposure of user data may be reduced, and the use of public cloud computing resources may be stimulated.

The CiS-operating platform may share data stored in the remote public cloud storage with the on-premise storage, and may restore storage by replacing the storage or adding new storage in the event of failure of the storage.

Through the application in the on-premise environment in which CiS runs, a user may make the apparatus for managing integrated storage supporting a hierarchical structure according to an embodiment of the present invention store data in the on-premise storage and public cloud storage depending on the characteristics of the data.

Here, in order to ensure data security, the apparatus for managing integrated storage supporting a hierarchical structure may perform separate storage of metadata, protection of data communication, and data encryption.

The apparatus for managing integrated storage supporting a hierarchical structure may perform separate storage of metadata by separately storing encrypted data and metadata in the public cloud storage and the on-premise storage.

The metadata may include information about an encryption key and the data.

The apparatus for managing integrated storage supporting a hierarchical structure may store the encrypted data in the public cloud storage, and may store the metadata pertaining to the encrypted data in the on-premise storage.

That is, the apparatus for managing integrated storage supporting a hierarchical structure according to an embodiment of the present invention may store encrypted data in the public cloud storage and store metadata pertaining to the encrypted data in the on-premise storage depending on the characteristics of the data.

The apparatus for managing integrated storage supporting a hierarchical structure may reduce the risk of data leakage by sorting data into groups so as to be separately stored.

Protection of data communication may ensure highly reliable data transmission through SSL/TLS-based encryption when the on-premise storage and the public cloud storage communicate with each other. Data encryption may provide three types of AES (128, 192 and 256) for encryption of data stored in the backend storage.

The apparatus for managing integrated storage supporting a hierarchical structure encrypts data and stores the same in the public cloud storage based on a predefined format. Therefore, the application of the public cloud storage cannot provide service using the corresponding data.

In order to solve this problem, the public cloud may run a virtual CiS appliance connected with the apparatus for managing integrated storage supporting a hierarchical structure.

The virtual CiS appliance may operate based on a master-slave structure through clustering with the CiS system in the on-premise environment, and may perform the procedure for accessing data in the backend storage in the same manner.

The public cloud may provide an application service using the data stored by the CiS when the application can be connected with the CiS.

Here, the public cloud may provide an application service using the data stored by the apparatus for managing integrated storage supporting a hierarchical structure when the application can be connected with the apparatus for managing integrated storage supporting a hierarchical structure.

In contrast, the public cloud and the remote system providing applications that are not connected with the CiS are not able to access the format or structure of data stored through the CiS. Accordingly, providing an application service for the data stored in the back end may be restricted at the application level.

Figure 33:
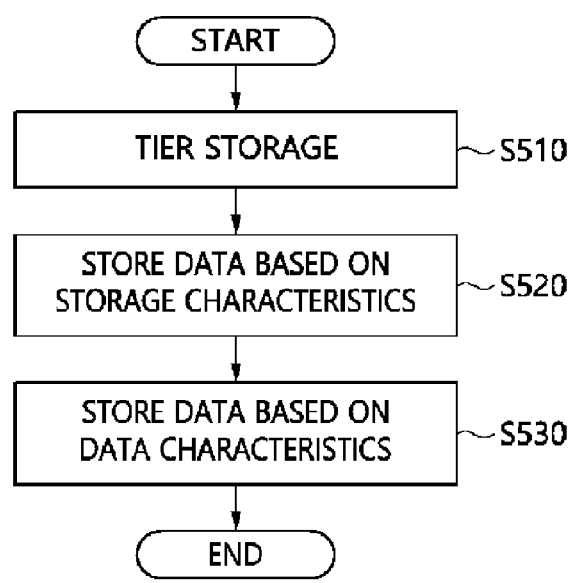
FIG. 33 is a flowchart illustrating a method for managing integrated storage supporting a hierarchical structure according to an embodiment of the present invention.

FIG. 33 is a flowchart illustrating a method for managing integrated storage supporting a hierarchical structure according to an embodiment of the present invention.

Referring to FIG. 33, in the method for managing integrated storage supporting a hierarchical structure according to an embodiment of the present invention, first, storage devices may be tiered at step S510.

That is, the storage devices included in public cloud storage and on-premise storage may be tiered depending on the characteristics of the storage devices at step S510.

Here, at step S510, the storage devices may be managed by classifying the same into a performance tier, a capacity tier, and an archive tier.

Here, at step S510, memory and flash storage may be managed at the performance tier.

Here, at step S510, the on-premise storage may be managed at the capacity tier.

Here, at step S510, the public cloud storage may be managed at the archive tier.

In the method for managing integrated storage supporting a hierarchical structure according to an embodiment of the present invention, data may be stored based on the characteristics of the storage devices at step S520.

That is, at step S520, data may be stored in the storage devices tiered depending on the characteristics of the storage devices.

Here, at step S520, data managed in the storage devices at the performance tier may be stored using a read cache and a write cache.

Here, at step S520, the location of data stored using the write cache may be stored as metadata.

Here, at step S520, the hash value of data stored using the read cache is calculated, and a pair comprising the data and the hash value may be stored.

Here, at step S520, the time at which data managed in the storage devices at the capacity tier and the archive tier is record is identified, and a log may be recorded depending on the time.

Here, at step S520, information about the time may be added to the end of the log.

In the method for managing integrated storage supporting a hierarchical structure according to an embodiment of the present invention, data may be relocated depending on the characteristics thereof at step S530.

That is, at step S530, data may be relocated in the tiered storage devices depending on the characteristics of the data.

Here, at step S530, separate storage of metadata, protection of data communication, and data encryption may be performed.

Here, at step S530, depending on the characteristics of data, the encrypted data may be stored in the public cloud storage, and metadata pertaining to the encrypted data may be separately stored in the on-premise storage.

Here, at step S530, highly reliable data transmission may be ensured through SSL/TLS-based encryption when the on-premise storage and the public cloud storage communicate with each other. In the case of data encryption, three types of AES (128, 192 and 256) may be provided in order to encrypt data stored in the backend storage.

Here, at step S530, the public cloud storage may provide an application service by accessing data in the on-premise storage using a virtual appliance.

Referring to FIG. 13, the apparatus for managing integrated storage supporting a hierarchical structure according to an embodiment of the present invention may be implemented in a computer system 1100 including a computer-readable recording medium. The computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. The memory may include ROM 1131 or RAM 1132.

The apparatus for managing integrated storage supporting a hierarchical structure according to an embodiment of the present invention may include one or more processors 1110 and executable memory 1130 for storing at least one program executed by the one or more processors 1110. The at least one program may tier storage devices included in public cloud storage and on-premise storage depending on the characteristics of the storage devices, may store data in the storage devices tiered depending on the characteristics of the storage devices, and may relocate the data in the tiered storage devices depending on the characteristics of the data.

Here, the at least one program may manage the storage devices by classifying the same into a performance tier, a capacity tier, and an archive tier.

Here, the at least one program may manage memory and flash storage at the performance tier.

Here, the at least one program manage the on-premise storage at the capacity tier.

Here, the at least one program may manage the public cloud storage at the archive tier.

Here, the at least one program may store data managed in the storage device at the performance tier using a read cache and a write cache.

Here, the at least one program may store the location of data stored using the write cache as metadata.

Here, the at least one program may calculate the hash value of data stored using the read cache, and may store a pair comprising the data and the hash value.

Here, the at least one program may identify the time at which the data managed in the storage devices at the capacity tier and the archive tier is recorded, and may record a log depending on the time.

Here, the at least one program may add information about the time to the end of the log.

Here, the at least one program may relocate the data in the tiered storage devices depending on the characteristic of the data.

Here, the at least one program may perform separate storage of metadata, protection of data communication, and data encryption.

Here, depending on the characteristics of the data, the at least one program may store the encrypted data in the public cloud storage and separately store metadata pertaining to the encrypted data in the on-premise storage.

Here, the at least one program may ensure highly reliable data transmission through SSL/TLS-based encryption when the on-premise storage and the public cloud storage communicate with each other. Data encryption may be configured to provide three types of AES (128, 192 and 256) for encryption of the data stored in the backend storage.

Here, the at least one program may enable the public cloud storage to provide an application service by accessing the data in the on-premise storage using a virtual appliance.

Also, the present invention may improve the performance of read/write operations in integrated storage in which cloud storage and on-premise storage are integrated.

Also, the present invention may enable cloud storage and on-premise storage included in integrated storage to provide a data storage service with the same performance.

Also, the present invention may move user data based on the resilience and cost efficiency of storage space.

Also, the present invention may support various types of cloud storage services, such as Amazon S3, MS Azure, and the like, thereby providing an integrated storage service that meets user requirements.

Also, the present invention may enable cloud storage to be accessed at a speed close to the speed at which on-premise storage is accessed.

Also, the present invention may provide a service interface through which a user is able to access cloud-integrated storage using various service protocols.

Also, the present invention may provide various types of storage services, such as a storage service based on conventional files or blocks, a storage service based on objects, which is provided in recent cloud storage, and the like.

Also, the present invention may ensure secure data transmission between on-premise storage and cloud storage, thereby guaranteeing the confidentiality of user data.

Also, the present invention may prevent data loss caused by system errors.

Also, the present invention may easily construct a system by providing cloud-integrated storage in the form of an appliance in which storage hardware and software are integrated for user convenience.

Also, the present invention may support a multi-tenant function for simultaneously running multiple cloud services.

Also, the present invention may improve storage management performance by managing the storage devices of on-premise storage and public cloud storage in a hierarchical structure.

Also, the present invention may reduce the risk of exposure of user data, and may stimulate the use of the computing resources of a public cloud.

As described above, the apparatus and method for managing integrated storage supporting a hierarchical structure according to the present invention are not limitedly applied to the configurations and operations of the above-described embodiments, but all or some of the embodiments may be selectively combined and configured, so the embodiments may be modified in various ways.

What is claimed is:

1. An apparatus for managing integrated storage supporting a hierarchical structure, comprising:
   one or more processors; and
   executable memory for storing at least one program executed by the one or more processors,
   wherein the at least one program is configured to:
   distribute data for storing in integrated storage including on-premise storage and cloud storage;
   provide connection to the integrated storage for storing distributed data, and storage tiering information corresponding to the data;
   provide the integrated storage as virtual data storage without considering actual storage location of the data;
   provide interface of single virtual volume corresponding to the virtual data storage for a user;
   process sensitive data in a protected data area through enhanced management function for the data manipulation in response to a request of the user, wherein input and output functions for the protected data area are blocked based on a hardware function and a virtualization, wherein the enhanced management function applies an enhanced policy which includes at least one of policies of replication, backups, snapshots, migration, error correction, and data protection;
   return result data corresponding to processed sensitive data; and
   determine storage-tiers of storages included in the integrated storage based on the performance, capacity and policy for data storage,
   wherein the storage-tiers include storage-types such as a location-based storage, a time-based storage, and a content addressable storage.

2. The apparatus of claim 1, wherein the storage-tiers is applied to the policy for data storage according to the storage-types.

3. The apparatus of claim 2, wherein the location-based storage is used as a write cache.

4. The apparatus of claim 3, wherein the time-based storage is used as a storage backend.

5. The apparatus of claim 4, wherein the content addressable storage is used as a read cache.

6. A method for managing integrated storage supporting a hierarchical structure, performed by an apparatus for managing the integrated storage supporting a hierarchical structure, comprising:
   distributing data for storing in integrated storage including on-premise storage and cloud storage;
   providing connection to the integrated storage for storing distributed data, and storage tiering information corresponding to the data;
   providing the integrated storage as virtual data storage without considering actual storage location of the data;
   providing interface of single virtual volume corresponding to the virtual data storage for a user;
   processing sensitive data in a protected data area through enhanced management function for the data manipulation in response to a request of the user, wherein input and output functions for the protected data area are blocked based on a hardware function and a virtualization, wherein the enhanced management function applies an enhanced policy which includes at least one of policies of replication, backups, snapshots, migration, error correction, and data protection;
   returning result data corresponding to processed sensitive data; and
   determining storage-tiers of storages included in the integrated storage based on the performance, capacity and the policy for data storage,
   wherein the storages included in the integrated storage related with the storage-tiering include location-based storage, time-based storage, and content addressable storage.

7. The method of claim 6, wherein the storage-tiers is applied to the policy for data storage according to the storage-types.

8. The method of claim 7, wherein the location-based storage is used as a write cache.

9. The method of claim 8, wherein time-based storage is used as a storage backend.

10. The method of claim 9, wherein the content addressable storage is used as a read cache.

* * * * *